(12) United States Patent
Kawano et al.

(10) Patent No.: US 9,244,737 B2
(45) Date of Patent: Jan. 26, 2016

(54) DATA TRANSFER CONTROL METHOD OF PARALLEL DISTRIBUTED PROCESSING SYSTEM, PARALLEL DISTRIBUTED PROCESSING SYSTEM, AND RECORDING MEDIUM

(75) Inventors: Takayuki Kawano, Yokohama (JP); Jun Yoshida, Yokohama (JP); Masaki Yotsutani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 269 days.

(21) Appl. No.: 13/978,798

(22) PCT Filed: Feb. 4, 2011

(86) PCT No.: PCT/JP2011/052435
§ 371 (c)(1),
(2), (4) Date: Jul. 9, 2013

(87) PCT Pub. No.: WO2012/105056
PCT Pub. Date: Aug. 9, 2012

(65) Prior Publication Data
US 2013/0290979 A1    Oct. 31, 2013

(51) Int. Cl.
*G06F 9/50* (2006.01)

(52) U.S. Cl.
CPC ............ *G06F 9/5027* (2013.01); *G06F 9/5083* (2013.01)

(58) Field of Classification Search
CPC .................................................... G06F 9/5027
USPC ........................................................ 718/104
See application file for complete search history.

(56) References Cited

U.S. PATENT DOCUMENTS 8,266,289 B2 * 9/2012 Saha et al. ................. 709/226

8,793,365 B2 * 7/2014 Arsovski et al. ............. 709/224
(Continued)

FOREIGN PATENT DOCUMENTS

| JP | 2000-268013 A | 9/2000 |
| JP | 2008-299791 A | 12/2008 |
| JP | 2010-140134 A | 6/2010 |
| JP | 2010-231502 A | 10/2010 |

OTHER PUBLICATIONS

Xie, Jiong, et al. "Improving mapreduce performance through data placement in heterogeneous hadoop clusters." Parallel & Distributed Processing, Workshops and Phd Forum (IPDPSW), 2010 IEEE International Symposium on. IEEE, 2010.*
(Continued)

*Primary Examiner* — Emerson Puente
*Assistant Examiner* — Charlie Sun
(74) *Attorney, Agent, or Firm* — Volpe and Koenig, P.C.

(57) ABSTRACT

A parallel distributed processing system includes multiple parallel distributed processing execution servers which stores data blocks pre-divided in a storage device and executes tasks processing the data blocks in parallel, and a management computer controlling the multiple parallel distributed processing execution servers. The management computer collects resource use amounts of the multiple parallel distributed processing execution servers, acquires states of data blocks and tasks held by the multiple parallel distributed processing execution servers, selects a second parallel distributed processing execution server transferring a data block to the first parallel distributed processing execution server, based on processing progress situations of the data blocks held by the multiple parallel distributed processing execution servers and the resource use amounts of the multiple parallel distributed processing execution servers, and transmits a command to transfer the data block to the first parallel distributed processing execution server, to the selected second parallel distributed processing execution server.

11 Claims, 23 Drawing Sheets

(56) References Cited

U.S. PATENT DOCUMENTS

| 8,819,106 | B1* | 8/2014 | Sirota et al. | 709/201 |
| 2007/0226744 | A1* | 9/2007 | Callaway et al. | 718/105 |
| 2009/0217267 | A1* | 8/2009 | Gebhart et al. | 718/100 |
| 2010/0153955 | A1* | 6/2010 | Sirota et al. | 718/102 |
| 2010/0251248 | A1 | 9/2010 | Hosouchi et al. | |

OTHER PUBLICATIONS

Multiplicity, wiktionary, retrieved on May 9, 2015.*
Tom White, "Hadoop: The Definitive Guide First Edition", Oreilly Media, Jan. 2010, p. 155.

* cited by examiner

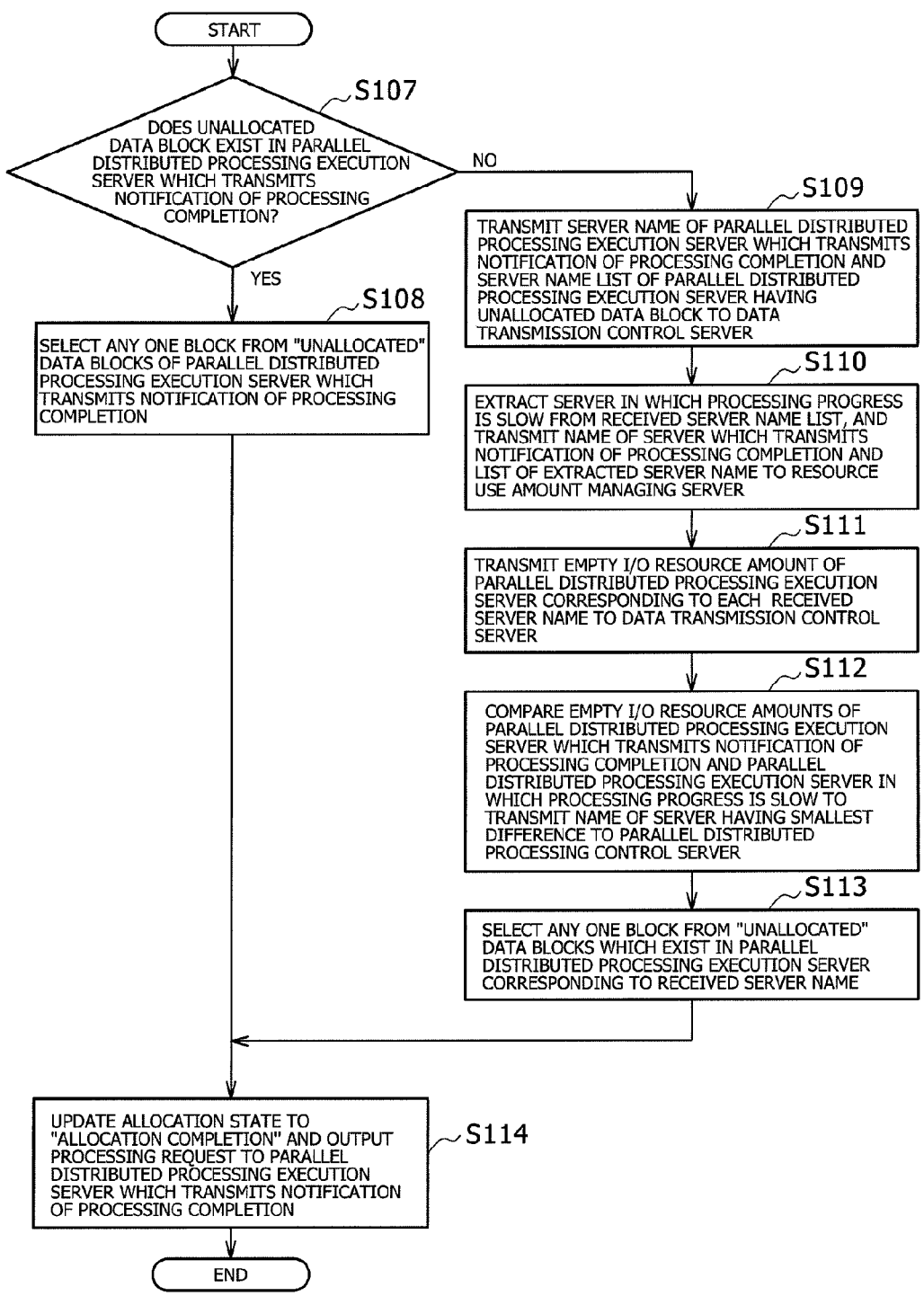

FIG.3

DATA INFORMATION MANAGEMENT TABLE ~300

| DATA BLOCK ID ~301 | DATA ARRANGED SERVER NAME ~302 | ALLOCATION STATE ~303 | PROCESSING STATE ~304 |
|---|---|---|---|
| BLOCK 1 | SERVER A | ALLOCATION COMPLETION | PROCESSING COMPLETION |
| BLOCK 2 | SERVER A | ALLOCATION COMPLETION | PROCESSING COMPLETION |
| ... | ... | ... | ... |
| BLOCK 10 | SERVER A | ALLOCATION COMPLETION | UNPROCESSED |
| BLOCK 11 | SERVER B | ALLOCATION COMPLETION | PROCESSING COMPLETION |
| ... | ... | ... | ... |
| BLOCK 20 | SERVER B | UNALLOCATED | UNPROCESSED |
| ... | ... | ... | ... |

FIG. 6

TASK MANAGEMENT TABLE ~600

| TASK ID ~601 | SERVER NAME ~602 | EXECUTION STATE ~603 | PROCESSING DATA BLOCK ID ~604 |
|---|---|---|---|
| TASK A1 | SERVER A | UNDER EXECUTION | DATA 9 |
| TASK A2 | SERVER A | UNDER EXECUTION | DATA 10 |
| TASK A1 | SERVER A | STAND-BY | - |
| TASK B1 | SERVER B | UNDER EXECUTION | DATA 17 |
| TASK B2 | SERVER B | STAND-BY | - |
| TASK C1 | SERVER C | UNDER EXECUTION | DATA 24 |
| TASK D1 | SERVER D | UNDER EXECUTION | DATA 34 |

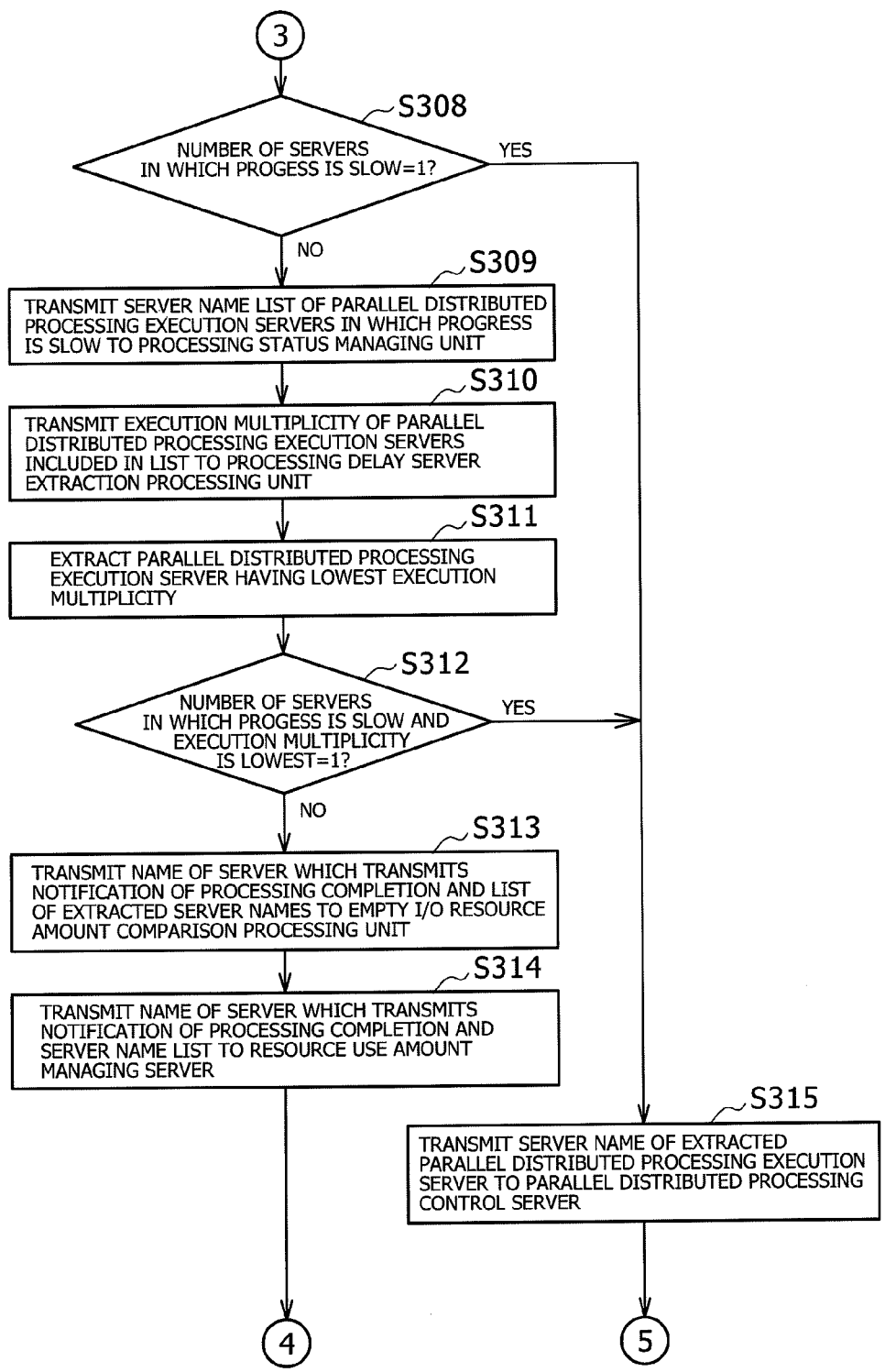

FIG.8

PROCESSING STATUS MANAGEMENT TABLE ~800

| SERVER NAME ~801 | PROCESSING COMPLETION DATA RATE ~802 | EXECUTION MULTIPLICITY ~803 |
|---|---|---|
| SERVER A | 80% | 3 |
| SERVER B | 60% | 2 |
| SERVER C | 30% | 1 |
| SERVER D | 30% | 1 |

FIG.9

PROCESSING STATUS MANAGEMENT TABLE ~800'

| SERVER NAME ~801 | PROCESSING COMPLETION DATA RATE ~802 | CPU TYPE ~903 | CPU CORE NUMBER ~904 | MEMORY TYPE ~905 |
|---|---|---|---|---|
| SERVER A | 80% | CPU 1 | 2 | MEMORY 1 |
| SERVER B | 60% | CPU 1 | 2 | MEMORY 2 |
| SERVER C | 30% | CPU 2 | 2 | MEMORY 2 |
| SERVER D | 30% | CPU 2 | 1 | MEMORY 2 |

FIG.12

RESOURCE USE AMOUNT MANAGEMENT TABLE ~1200

| SERVER NAME ~1201 | NETWORK I/O USE AMOUNT ~1202 | DISK I/O USE AMOUNT ~1203 |
|---|---|---|
| SERVER A | 70% | 60% |
| SERVER B | 60% | 65% |
| SERVER C | 90% | 90% |
| SERVER D | 70% | 65% |

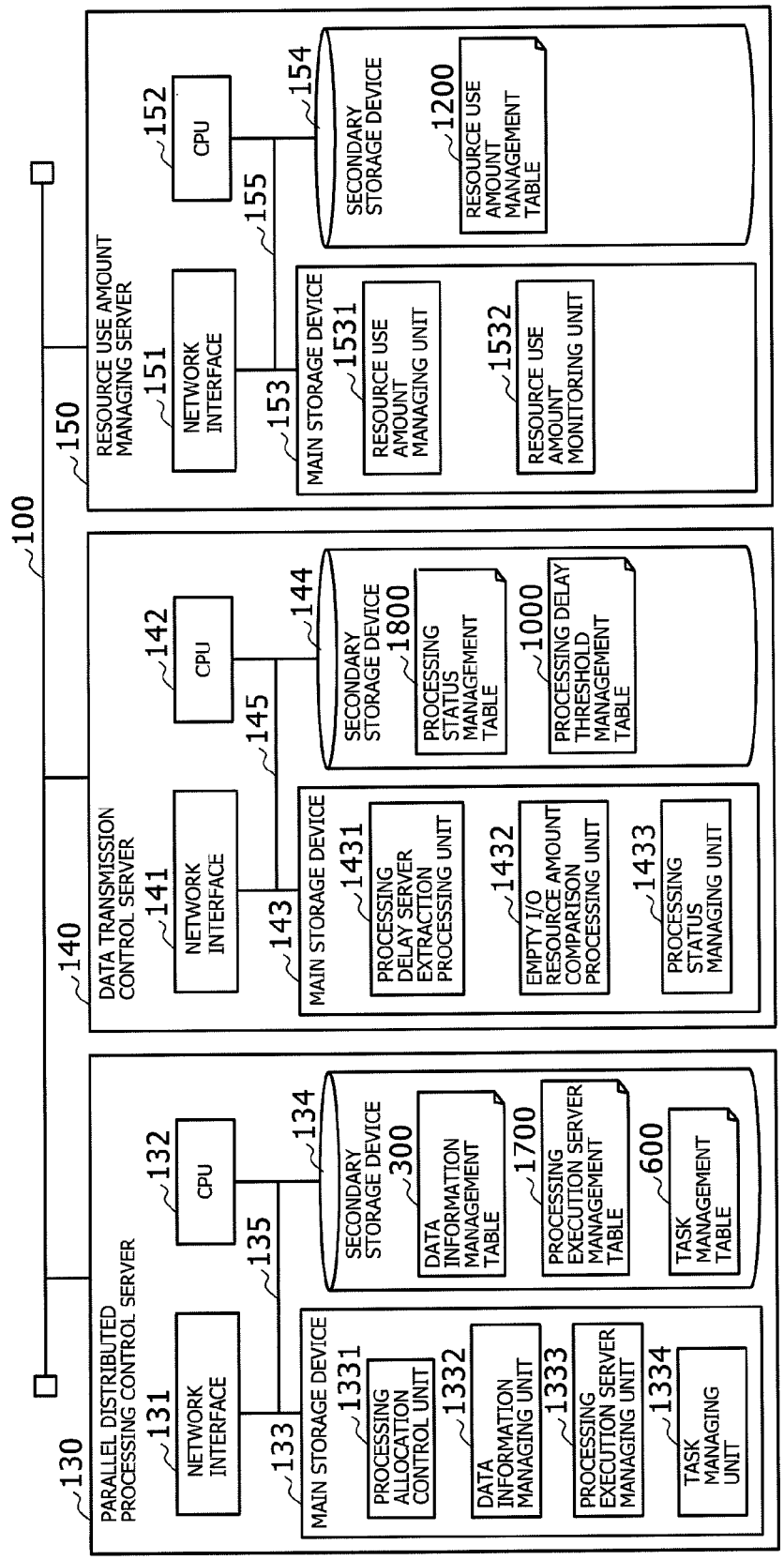

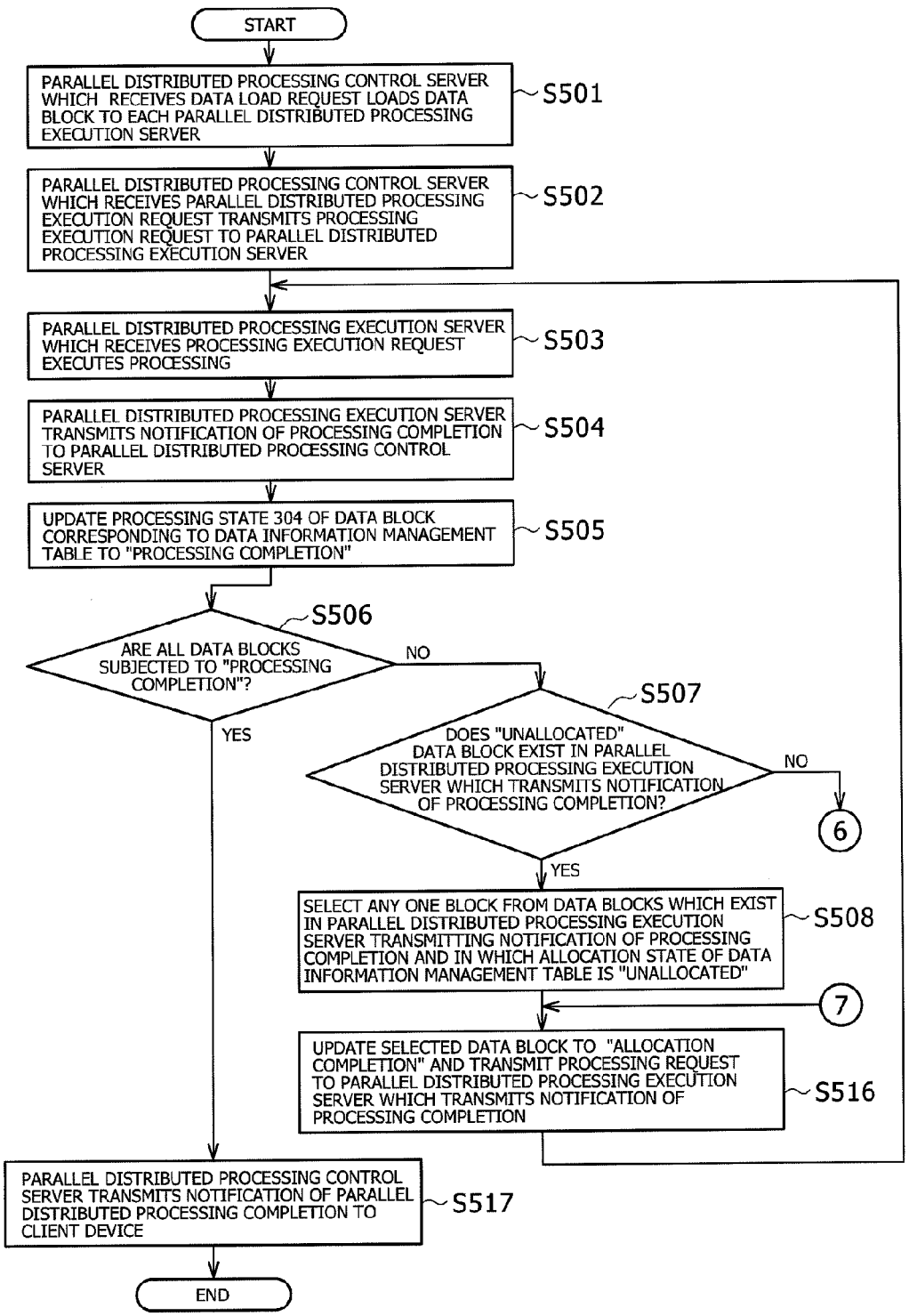

FIG.17

PROCESSING EXECUTION SERVER MANAGEMENT TABLE ~1700

| PHYSICAL SERVER NAME ~1701 | VIRTUAL SERVER NAME ~1702 |
|---|---|
| SERVER A | SERVER A1 |
|  | SERVER A2 |
|  | SERVER A3 |
| SERVER B | SERVER B1 |
|  | SERVER B2 |
|  | SERVER B3 |
| SERVER C | SERVER C1 |
|  | SERVER C2 |
| SERVER D | SERVER D1 |

FIG.18

PROCESSING STATUS MANAGEMENT TABLE ~1800

| PHYSICAL SERVER NAME ~1801 | VIRTUAL SERVER ID ~1802 | PROCESSING COMPLETION DATA RATE ~1803 | EXECUTION MULTIPLICITY ~1804 |
|---|---|---|---|
| SERVER A | SERVER A1 | 80% | 3 |
| | SERVER A2 | 60% | 2 |
| | SERVER A3 | 30% | 1 |
| SERVER B | SERVER B1 | 70% | 3 |
| | SERVER B2 | 50% | 2 |
| | SERVER B3 | 25% | 1 |
| SERVER C | SERVER C1 | 85% | 3 |
| | SERVER C2 | 60% | 2 |
| SERVER D | SERVER D1 | 80% | 3 |

DATA TRANSFER CONTROL METHOD OF PARALLEL DISTRIBUTED PROCESSING SYSTEM, PARALLEL DISTRIBUTED PROCESSING SYSTEM, AND RECORDING MEDIUM

BACKGROUND

The present invention relates to a method and an apparatus for controlling data using data processing history information or server operating history information.

In recent years, big data such as data acquired from a sensor device such as radio frequency identification (RFID) or an access log to a website can be accumulated by greater capacity and less cost of a recording medium. Therefore, companies and organizations attempt to analyze the big data which has been accumulated up to now, but not utilized and utilize the analysis result in a business. As a technology that analyzes the big data for a short time, a parallel distributed processing technology attracts attention. However, a utilization method or an analysis method of data is not clearly determined for log data, and the like which have not been utilized up to now, and trial and error are required. In the parallel distributed processing, since the processing is divided and the divided processing is allocated to multiple servers to be distributively executed in parallel, the multiple servers need to be prepared. As a result, since an effect to investment by introduction of a parallel distributed processing system in an initial stage is obscure, it is difficult to introduce the parallel distributed processing system to customers.

Therefore, by introducing the parallel distributed processing system, it is considered that a new server is not prepared, but an empty resource of a server used by an existing system is effectively utilized, and the existing system and the parallel distributed processing system coexist.

In the parallel distributed processing, since processing target data is divided into blocks having defined sizes and the respective blocks are independently processed in parallel simultaneously in multiple servers, the big data can be processed for a short time. Under a situation in which the processing target data is distributed and stored in each server that executes the parallel distributed processing, when processing of data which is stored in another server is allocated to a task on any server, data is transferred between servers, thereby causing processing delay. Therefore, it is disclosed a scheduling method of allocating processing to a task of the networkedly closest server in the servers storing the processing target data at the time of allocating the processing by considering processing efficiency of the parallel distributed processing {see "Hadoop: The Definitive Guide First Edition" written by Tom White, published in Oreilly Media which was issued on January 2010, p. 155 (Non-patent Document 1)}.

Further, a scheduling method is disclosed, which calculates a rate of processing allocation completed data for the stored data and allocates processing of data stored in a server having the smallest rate when processing of the data stored in another server is allocated, in order to reduce the number of transmission times of data between the servers {see Japanese Unexamined Patent Application Publication No. 2010-231502 (Patent Document 1)}.

It is assumed that a priority of the existing system is higher than that of the parallel distributed processing system when the existing system and the parallel distributed processing system operate together. Therefore, the parallel distributed processing system needs to execute processing by using an empty resource of the server so as to prevent the operation of the existing system from being interrupted. As a result, execution multiplicity needs to be dynamically changed to respond to a variation in the load of the existing system for each server, and a difference in a processable data amount of each server per unit time easily occurs. Further, since the execution multiplicity is dynamically changed, it is difficult to arrange data in each server so as to reduce data transfer according to processing performance of each server before executing the parallel distributed processing and there is a possibility that transmission processing of big data will be performed. Under an environment in which the execution multiplicity is dynamically changed, a method of allocating processing of data to each server so as to reduce a data transfer cost while executing the parallel distributed processing is important in terms of efficiency of the parallel distributed processing.

SUMMARY

By using a technique disclosed in Non-patent Document 1, since data stored in a self-sever can be processed as possible, data transfer can be suppressed. Further, when processing of data stored in another server is allocated, processing of data stored in a networkedly closest server is allocated, and as a result, data transfer cost can be suppressed.

However, in the technique of Patent Document 1, the data transfer cost cannot particularly be suppressed under a situation in which an existing system having high priority and a parallel distributed processing system coexist to be operated.

For example, in the parallel distributed processing system which is operated through coexistence with the existing system, a difference in processing performance of each server per unit time easily occurs and there is a possibility that bias in amount of unprocessed data will occur in each server. As a result, when processing is allocated to a task on any server, in the case where the amount of unprocessed data of the server which is closest is small, unprocessed data of the self-server is removed at an early stage, in a task of a transfer source server. Therefore, the number of times to acquire data from another server is increased, and data is frequently transferred.

In the parallel distributed processing system, as one of methods of preventing the data from being frequently transferred, Patent Document 1 is known. By using the technique disclosed in Patent Document 1, in the case where the processing of the data stored in another server is allocated to the task of the self-server, a rate of the allocation completed data of each server is calculated to determine which server processing of data stored in is allocated. In the determination, a possibility that data will be transferred and acquired to the self-server from a server having small unallocated data is decreased. Therefore, each server can process data stored in the self-server as possible, the number of data transfer times is reduced.

However, under the situation in which the parallel distributed processing system is operated through coexistence with the existing system having high priority, the related art such as Patent Document 1 is not particularly sufficient.

For example, in the parallel distributed processing system, the execution multiplicity needs to be changed in accordance with a load variation or a resource variation of the existing system. As a result, when the load of the existing system is increased, the execution multiplicity needs to be decreased in a parallel distributed processing execution system having low priority. Therefore, there is a possibility that a task already allocated with processing cannot execute the processing by a decrease in execution multiplicity. Further, since the multiplicities of the respective servers are different from each other, the amounts of data which can be processed per unit time in the respective servers are different from each other. As a result, even when the rate of the allocation completed data is small, the amount of data which can be processed per unit time is large and there is a possibility that unprocessed data can be processed within a shorter time than other servers.

Further, under the situation in which the parallel distributed processing system coexists with the existing system, an I/O resource amount which the parallel distributed processing system can use to transfer data is also different for each server. As a result, even in the case where empty I/O resource amounts are a lot in a server of a transmission destination of data and big data can be transferred once, when a server in which an I/O resource amount usable in a transmission source server is small, data needs to be transferred to a server in which the empty I/O resource amount is small and the empty I/O resource of the transmission destination server cannot be maximally used. Therefore, there is a possibility that a data transfer time is increased to thereby influence a total processing time of the parallel distributed processing system.

Accordingly, under the environment in which the parallel distributed processing system operates together with the existing system having high priority even in the case where a computer resource which is allocable to the parallel distributed processing system varies, and as a result, effective multiplicity of the parallel distributed processing system is changed, data is allocated to each server so as to efficiently execute subsequent parallel processing in terms of the number of data transfer times and the amount of used resources.

The present invention has been made in an effort to reduce the number of data transfer times under a situation in which a computer resource allocable to a parallel distributed processing system varies and execution multiplicity of parallel distributed processing is changed.

According to an aspect of the present invention, there is provided a data transfer control method of a parallel distributed processing system in which a management computer selects a second parallel distributed processing execution server which is a transmission source of a data block allocated to a task of a first parallel distributed processing execution server, in the parallel distributed processing system including multiple parallel distributed processing execution servers including a processor and a storage device, in which the storage device stores data blocks divided in advance as processing target data and the processor executes tasks processing the data blocks in parallel, and a management computer controlling the multiple parallel distributed processing execution servers, including: a first step of receiving, by the management computer, a completion notification indicating completion of the task from the first parallel distributed processing execution server; a second step of respectively collecting, by the management computer, resource use amounts of the multiple parallel distributed processing execution servers; a third step of acquiring, by the management computer, states of data blocks and tasks held by the multiple parallel distributed processing execution servers; a fourth step of selecting, by the management computer, a second parallel distributed processing execution server transferring a data block to the first parallel distributed processing execution server, based on processing progress situations of the data blocks held by the multiple parallel distributed processing execution servers and the resource use amounts of the multiple parallel distributed processing execution servers; a fifth step of transmitting, by the management computer, a command to transfer the data block to the first parallel distributed processing execution server, to the selected second parallel distributed processing execution server; and a sixth step of transmitting, by the management computer, a command to execute a task processing the transferred data block, to the first parallel distributed processing execution server.

According to aspects of the present invention, there can be provided a method and an apparatus of transferring data in which the number of data transfer time is reduced and further, a data transfer time is shortened to efficiently execute entire parallel distributed processing, in a parallel distributed processing system in which computer resources usable while executing parallel distributed processing vary and execution multiplicity of the parallel distributed processing is changed.

BRIEF DESCRIPTION OF THE DRAWINGS

FIG. 2B is a flowchart illustrating detailed processing performed in allocation processing 5116 of FIG. 2A according to the first embodiment of the present invention;

FIG. 3 is a diagram illustrating one example of a data information management table according to the first embodiment of the present invention;

FIG. 6 is a diagram illustrating one example of a task management table according to the first embodiment of the present invention;

FIG. 7B is a flowchart illustrating one example of processing performed when a conditional branch in step S305 of FIG. 7A is YES;

FIG. 8 is a diagram illustrating one example of a processing situation management table according to the first embodiment of the present invention;

FIG. 9 is a diagram illustrating a modification of the processing situation management table according to the first embodiment of the present invention;

FIG. 12 is a diagram illustrating one example of a resource use amount management table according to the first embodiment of the present invention;

FIG. 14B is a block diagram illustrating one example of each server in the computer system according to the second embodiment of the present invention;

FIG. 15A is a flowchart illustrating entire processing of parallel distributed processing according to the first embodiment of the present invention;

FIG. 17 is a diagram illustrating one example of a processing execution server management table according to the second embodiment of the present invention; and FIG. 18 is a diagram illustrating one example of a processing situation management table according to the second embodiment of the present invention.

DETAILED DESCRIPTION OF THE PREFERRED EMBODIMENTS

Aspects (hereinafter, referred to as "embodiments") for implementing the present invention will be appropriately described in detail with reference to the accompanying drawings.

<First Embodiment>

First, a first embodiment of the present invention will be described with reference to FIGS. 1 to 13.

<System Configuration>

Figure 1A:
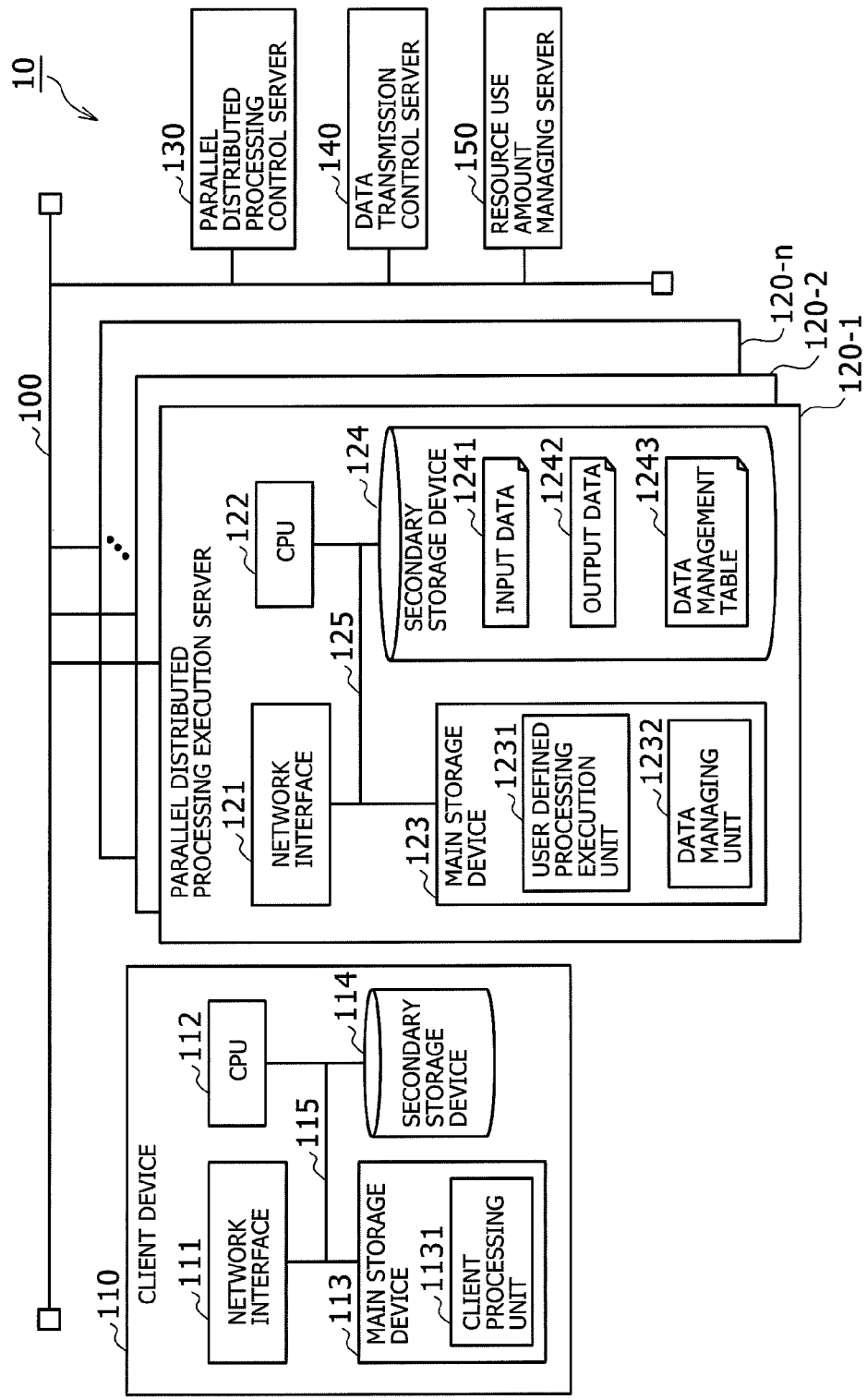
FIG. 1A is a block diagram illustrating one example of a computer system according to a first embodiment of the present invention.
Figure 1B:
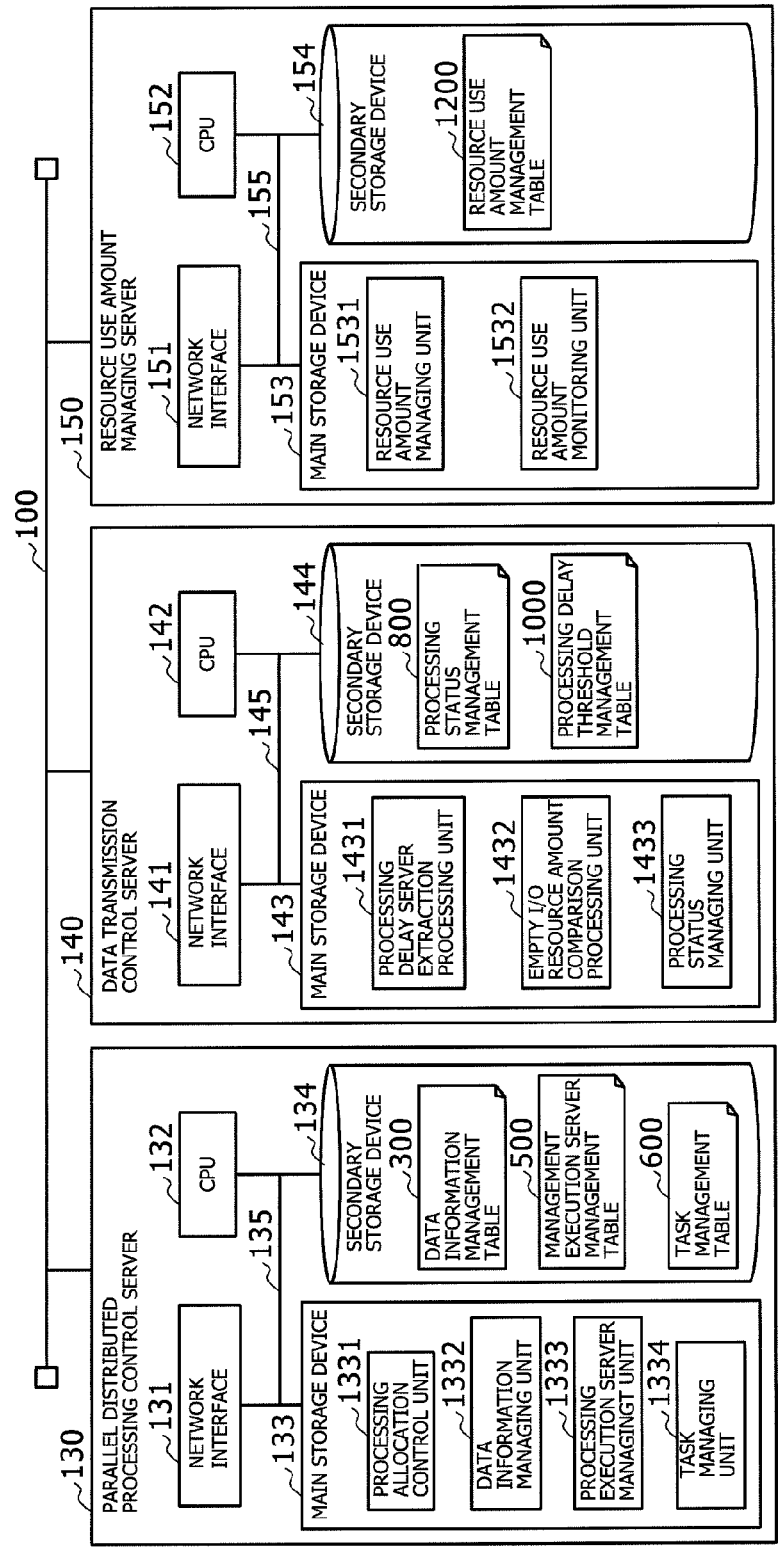
FIG. 1B is a detailed block diagram of each server in the computer system according to the first embodiment of the present invention.

FIGS. 1A and 1B are block diagrams illustrating one example of a configuration of a computer system according to a first embodiment of the present invention.

In a computer system 10, a client device 110, multiple parallel distributed processing execution servers 120-1 to **120-*n*, a parallel distributed processing control server 130, a data transfer control server 140, and a resource use amount managing server 150 are connected to each other through a network 100. Further, the network 100 is a local area network (LAN), a wide area network (WAN), or a global network such as Internet. In addition, the network 100 may be divided into multiple networks 100. Further, a collective term of the parallel distributed processing execution servers 120-1 to 120-*n* is referred to as the parallel distributed processing execution server 120**.

<Client Device>

The client device 110 is a computer including a network interface 111, a CPU 112, a main storage device 113, a secondary storage device 114, and a bus (or an interconnect) 115 that connect them to each other.

The network interface 111 is an interface for connecting the client device 110 to the network 100. The CPU 112 is an arithmetic processing unit that implements a predetermined function of the client device 110 by executing a program stored in the main storage device 113. The main storage device 113 is a storage device such as a RAM that stores a program executed by the CPU 112 and data required to execute the program. The program is, for example, a program for implementing a function of an OS (not illustrated) or a client processing unit 1131. The secondary storage device 114 is a non-volatile storage medium such as a hard disk device, which stores a program and data required to implement the predetermined function of the client device 110. Further, the secondary storage device 114 is not limited to a magnetic storage medium such as the hard disk device and may be a nonvolatile semiconductor storage medium such as a flash memory.

<Parallel Distributed Processing Execution Server>

The parallel distributed processing execution server 120 is a computer including a network interface 121, a CPU 122, a main storage device 123, a secondary storage device 124, and a bus (or an interconnect) 125 that connects them to each other. Further, configurations of the parallel distributed processing execution servers 120-1 to **120-*n*** are the same as each other.

The network interface 121 is an interface for connecting the parallel distributed processing execution server 120 to the network 100. The CPU 122 is an arithmetic processing unit that implements a predetermined function of the parallel distributed processing execution server by executing a program stored in the main storage device 123. The main storage device 123 is a storage device such as the RAM that stores a program executed by the CPU 122 and data required to execute the program. The program is, for example, a program for implementing functions of an OS (not illustrated), a user defined processing execution unit 1231, and a data managing unit 1232. The secondary storage device 124 is the non-volatile storage medium such as the hard disk device that stores the program required to implement the predetermined function of the parallel distributed processing execution server 120 and data including input data 1241, output data 1242, a data management table 1243, and the like. Further, the secondary storage device 124 is not limited to the magnetic storage medium such as the hard disk device and may be the non-volatile semiconductor storage medium such as the flash memory.

The input data 1241 and the output data 1242 will be additionally described. The input data 1241 is logical data constituted by multiple data blocks divided with defined sizes and includes names and information for identifying the constituent data blocks. The information for identifying the data blocks of the input data 1241 is, for example, address information of the parallel distributed processing execution server 120 storing the data blocks and names of the data blocks. Entities of data are stored in the parallel distributed processing execution server 120 as the data block. The output data 1242 is data output by the parallel distributed processing.

The user defined processing execution unit 1231 executes an allocated task. The data managing unit 1232 manages allocation of a data block (input data 1241) to the task.

<Parallel Distributed Processing Control Server>

The parallel distributed processing control server 130 is a server for allocating processing to each parallel distributed processing execution server 120 and controlling execution of entire parallel distributed processing, and includes a parallel distributed processing network interface 131, a CPU 132, a main storage device 133, a secondary storage device 134, and a bus 135 connecting them to each other.

The network interface 131 is an interface for connecting the parallel distributed processing control server 130 to the network 100. The CPU 132 is an arithmetic processing unit that implements a predetermined function of the parallel distributed processing execution server by executing a program stored in the main storage device 133. The main storage device 133 is a storage device such as the RAM that stores a program executed by the CPU 132 and data required to execute the program. The program is, for example, a program for implementing functions of an OS (not illustrated), a processing allocation control unit 1331, a data information managing unit 1332, a processing execution server managing unit 1333, and a task managing unit 1334. The secondary storage device 134 is the non-volatile storage medium such as the hard disk device that stores the program required for the parallel distributed processing control server 130 to implement a predetermined function and data including a data information management table 300, a processing execution server management table 500, a task management table 600, or the like. Further, the secondary storage device 134 is not limited to the magnetic storage medium such as the hard disk device and may be the non-volatile semiconductor storage medium such as the flash memory.

Further, functions of the processing allocation control unit 1331, the data information managing unit 1332, the processing execution server managing unit 1333, and the task managing unit 1334 will be described below when describing the processing.

<Data transfer Control Server>

The data transfer control server 140 is a server that selects a parallel distributed processing execution server storing a processed data block when processing of a data block stored in the parallel distributed processing execution server 120 is allocated unlike the parallel distributed processing execution server 120 that allocates the processing, and includes a network interface 141, a CPU 142, a main storage device 143, a secondary storage device 144, and a bus 145 connecting them to each other.

The network interface 141 is an interface for connecting the data transfer control server 140 to the network 100. The CPU 142 is an arithmetic processing unit that implements a predetermined function of the data transfer control server 140 by executing a program stored in the main storage device 143. The main storage device 143 is a storage device such as the RAM that stores a program executed by the CPU 142 and data required to execute the program. The program is, for example, a program for implementing functions of an OS (not illustrated), a processing delay server extraction processing unit 1431, an empty I/O resource amount comparison processing unit 1432, and a processing situation managing unit 1433. The secondary storage device 144 is the non-volatile storage medium such as the hard disk device that stores the program required for the data transfer control server 140 to implement a predetermined function and data of a processing situation management table 800, a processing delay threshold management table 1000, or the like. Further, the secondary storage device 144 is not limited to the magnetic storage medium such as the hard disk device and may be the non-volatile semiconductor storage medium such as the flash memory.

Further, respective functions of the processing delay server extraction processing unit 1431, the empty I/O resource amount comparison processing unit 1432, and the processing situation managing unit 1433 will be described below when describing processing.

<Resource Use Amount Managing Server>

The resource use amount managing server 150 is a server for managing an I/O resource use amount of each server, and includes a network interface 151, a CPU 152, a main storage device 153, a secondary storage device 154, and a bus 155 connecting them to each other.

The network interface 151 is an interface for connecting the resource use amount managing server 150 to the network 100. The CPU 152 is an arithmetic processing unit that implements a predetermined function of the resource use amount managing server 150 by executing a program stored in the main storage device 153. The main storage device 153 is a storage device such as the RAM that stores a program executed by the CPU 152 and data required to execute the program. The program is, for example, a program for implementing functions of an OS (not illustrated), a resource use amount managing unit 1531, and a resource use amount monitoring unit 1532. The secondary storage device 154 is the non-volatile storage medium such as the hard disk device that stores a program required for the resource use amount managing server 150 to implement a predetermined function and data of a resource use amount management table 1200, or the like. Further, the secondary storage device 154 is not limited to the magnetic storage medium such as the hard disk device and may be the non-volatile semiconductor storage medium such as the flash memory.

Further, respective functions of the resource use amount managing unit 1531 and the resource use amount monitoring unit 1532 will be described below when describing processing.

As described above, a hardware configuration and a software configuration of each device are described, but the configurations of the client device 110, the parallel distributed processing execution server 120, the parallel distributed processing control server 130, the data transfer control server 140, and the resource use amount managing server 150 are not limited to the configurations illustrated in FIGS. 1A and 1B. For example, the parallel distributed processing control server 130, the data transfer control server 140, and the resource use amount managing server 150 may be configured to operate on any one server of the client device 110 and the parallel distributed processing execution server 120. Further, in FIGS. 1A and 1B, the parallel distributed processing control server 130, the data transfer control server 140, and the resource use amount managing server 150 are configured to be executed on other servers, but all or some may be executed on the same server. When the parallel distributed processing control server 130, the data transfer control server 140, and the resource use amount managing server 150 are executed as one server, the programs of the respective servers serve as the parallel distributed processing control unit, the data transfer control unit, and the resource use amount managing unit. Further, the programs of the parallel distributed processing control unit, the data transfer control unit, and the resource use amount managing unit may be installed in the same server by a program distributing server or a non-transitory computer-readable storage medium.

Next, referring to FIGS. 1A and 1B, the first embodiment of the present invention is described with reference to FIGS. 2A to 13 and processing is described.

<Overall Processing>

Figure 2A:
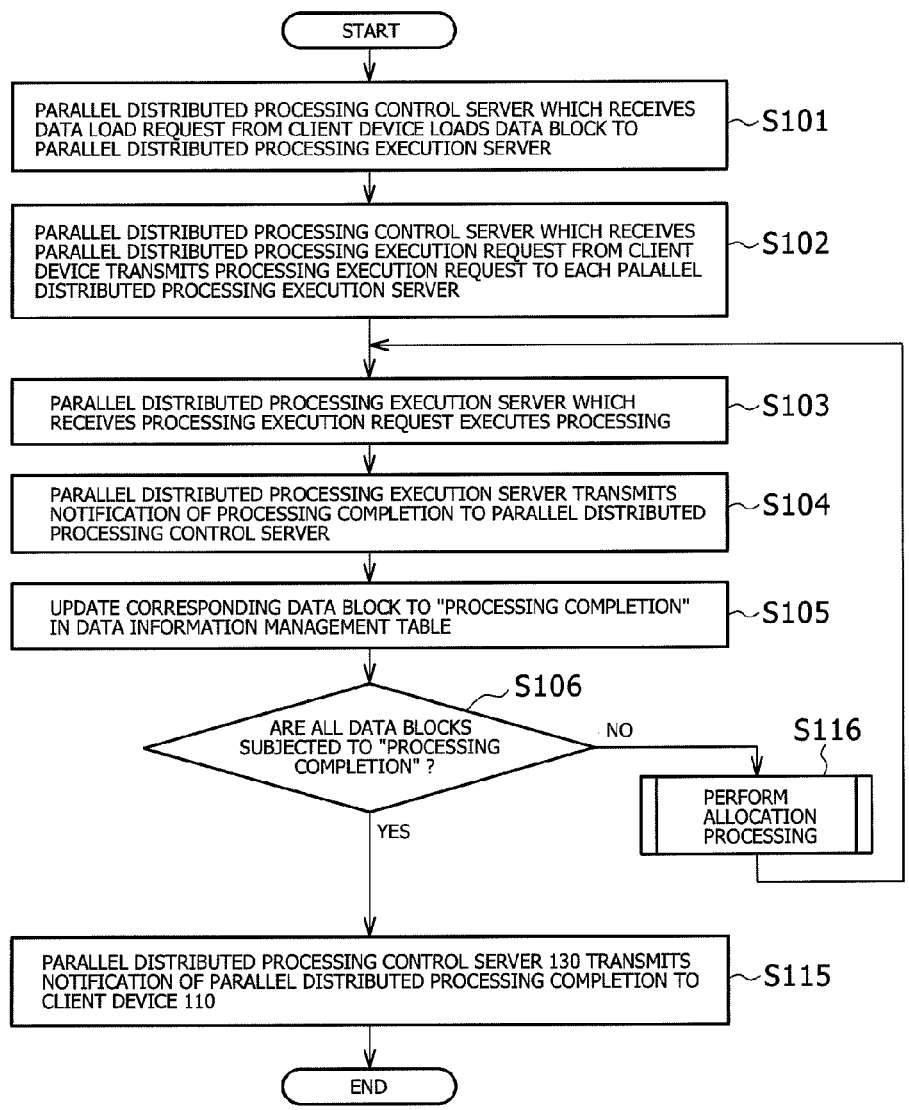
FIG. 2A is a flowchart illustrating entire processing of parallel distributed processing according to the first embodiment of the present invention.

FIGS. 2A and 2B are flowcharts illustrating an overall processing flow regarding parallel distributed processing according to the first embodiment of the present invention.

First, a request for data loading of processing target data (input data 1241) is transferred from the client device 110 to the parallel distributed processing control server 130. The parallel distributed processing control server 130 that receives the request for data loading divides the load target data into data blocks (input data 1241) having a defined size, and distributes and loads the divided data blocks to multiple parallel distributed processing execution servers 120 (S101).

Next, a request for executing the parallel distributed processing is transmitted from the client device 110 to the parallel distributed processing control server 130. The processing allocation control unit 1331 of the parallel distributed processing control server 130 that receives the request for executing the parallel distributed processing transmits a request for processing execution of the loaded data blocks, to each parallel distributed processing execution server 120, and the data information managing unit 1332 updates a data block allocation state 303 which is a processing target of the data information management table 300 to "allocation completion" (S102). Further, the processing execution request which transmitted by the processing allocation control unit 1331 includes a data block ID of the processing target data block and a task ID of a task that executes the processing of each data block. Herein, the task is a program that executes predetermined processing of the processing target data block as the input data 1241.

Subsequently, the user defined processing execution unit of the parallel distributed processing execution server 120 that receives the processing execution processing request executes predetermined processing by using a data block designated by the processing execution request in each task as the input data 1241 (S103). That is, the user defined processing execution unit 1231 of the parallel distributed processing execution server 120 starts the task designated by the processing execution request and allocates the data block designated by the processing execution request to each task as the input data 1241 to execute processing.

The parallel distributed processing execution server 120 transmits a task ID of a task of which processing is completed as a processing completion notification to the parallel distributed processing control server 130 from the corresponding parallel distributed processing execution server 120, when processing of the data block designated as the input data 1241 is completed with respect to the allocated task (S104).

Further, the data information managing unit 1332 of the parallel distributed processing control server 130 that receives the processing completion notification updates the processing state 304 of the corresponding data block ID 301 of the data information management table 300 to "processing completion" (S105).

Subsequently, the processing allocation control unit 1331 of the parallel distributed processing control server 130 determines whether the processing states 304 of all of the data blocks are "processing completion" with reference to the data information management table 300 (S106).

As a result of the determination of step S106, when all of the data blocks are in "processing completion" (S106→Yes), the processing allocation control unit 1331 of the parallel distributed processing control server 130 transmits a notification of parallel distributed processing completion to the client device 110, and the computer system 10 terminates the parallel distributed processing.

As a result of the determination of step S106, when any one data block is not in "processing completion" (S106→No), the parallel distributed processing control server 130 performs the allocation processing (S116) of FIG. 2B in step S116 and thereafter, the process returns to step S103 and the processing is repeated.

In the allocation processing of FIG. 2B, the parallel distributed processing control server 130 determines whether a data block where the allocation state 403 is in "unallocation" exists in the parallel distributed processing execution server 120 that transmits the processing completion notification with reference to the data information management table 300 (S107).

As a result of the determination of step S107, when the unallocated data block exists in the parallel distributed processing execution server 120 that transmits the processing completion notification (S107→Yes), the processing allocation control unit 1331 of the parallel distributed processing control server 130 selects one predetermined data block from unallocated data blocks which exist in the parallel distributed processing execution server 120 that transmits the processing completion notification (S108).

As the result of the determination of step S107, when the unallocated data block does not exist in the parallel distributed processing execution server 120 that transmits the processing completion notification (S107→No), the process proceeds to step S109. The processing allocation control unit 1331 of the parallel distributed processing control server 130 generates a server name of the parallel distributed processing execution server 120 that transmits the processing completion notification and a server name list of the parallel distributed processing execution server 120 having the unallocated data block from the data information management table 300 and transmits the generated server name and server name list to the data transfer control server 140 (S109).

Next, the processing delay server extraction processing unit 1431 of the data transfer control server 140 extracts a processing delay server from the parallel distributed processing execution server 120 included in the server name list having the received unallocated data block.

Herein, the processing delay server indicates the parallel distributed processing execution server 120 in which a processing progress is delayed. In the embodiment, as described below, a rate of the total number of data blocks held by the parallel distributed processing execution server 120 and the number of processing completed data blocks in which processing is already completed by executing the task is acquired as a processing completion data rate, and the parallel distributed processing execution server 120 in which the processing completion data rate is less than a threshold 1001 is extracted as the processing delay server in which the processing progress is delayed.

The processing delay server extraction processing unit 1431 of the data transfer control server 140 transmits a server name of the parallel distributed processing execution server 120 that transmits the processing completion notification and a server name list of the extracted server to the resource use amount managing server 150 and requests an empty I/O resource amount of each parallel distributed processing execution server 120 (S110).

Subsequently, the resource use amount managing unit 1531 of the resource use amount managing server 150 acquires the empty I/O resource amounts of the parallel distributed processing execution server 120 that transmits the processing completion notification and the parallel distributed processing execution server 120 included in the server name list and transmits the acquired empty I/O resource amount to the data transfer control server 140 with reference to the resource use amount management table 1200 (S111). Further, the empty I/O resource amounts include an empty I/O resource amount of a network I/O and an empty I/O resource amount of a disk I/O.

Herein, the empty I/O resource amount of the network I/O represents a data transfer speed (Gbps) which is usable in the network interface 121 of the parallel distributed processing execution server 120 as a rate. The data transfer speed which is usable in the network interface 121 is a value that is represented by dividing a value acquired by subtracting a currently used band (transfer speed) from a theoretical value of the transmission speed of data which is transferrable in the network interface 121 by a theoretical value of the data transfer speed. That is, the empty I/O resource amount of the network I/O=(theoretical value −current use band) theoretical value. The currently used band may adopt an average value of the data transfer speed for a predetermined time (for example, for 1 minute). Further, instead of the theoretical value of the data transfer speed, a value acquired by multiplying an effective value or a theoretical value of a link speed of the network interface 121 by a predetermined rate may be used.

Herein, in the empty I/O resource amount of the disk I/O, a data transfer speed (MByte/sec) which is usable in the secondary storage device 124 of the parallel distributed processing execution server 120 is represented as a rate. The data transfer speed which is usable in the secondary storage device 124 is a rate acquired by dividing a value acquired by subtracting the currently used band (transmission speed) from a theoretical value of the transmission speed of the data which is transmissible in the secondary storage device 124, by a theoretical value. That is, the empty I/O resource amount of the disk I/O=(theoretical value−current use band) theoretical value. The currently used band may adopt an average value of the data transfer speed for a predetermined time (for example, for 1 minute). Further, a value acquired by multiplying an effective value or a theoretical value of the data transfer speed of the secondary storage device 124 by a predetermined rate may be used.

Further, the empty I/O resource amount comparison processing unit 1432 of the data transfer control server 140 compares the empty I/O resource amount of the parallel distributed processing execution server 120 that transmits the processing completion notification and the empty I/O resource amount of each processing delay server to select a processing delay server in which a difference in the empty I/O resource amount is the smallest and transmit a name of the selected processing delay server to the parallel distributed processing control server 130 (S112).

Next, the processing allocation control unit 1331 of the parallel distributed processing control server 130 selects one predetermined data block from the unallocated data blocks which exist in the parallel distributed processing execution server 120 corresponding to the processing delay server name received from the data transfer control server 140 (S113). That is, the processing allocation control unit 1331 arbitrarily selects one data block ID from the data block ID in which the allocation state 303 is the unallocated state among data arrangement server names 302 which coincide with the processing delay server name received from the data transfer control server 140 with reference to the data information management table 300. The selection is made by a widely known or publicly known method such as an ascending order or a round-robin of the data block ID.

Further, the data information managing unit 1332 of the parallel distributed processing control server 130 updates the allocation state 303 of the selected data block to "allocation completion" in the data information management table 300. Further, the processing allocation control unit 1331 transmits a request for processing of the data block updated as the "allocation completion" to the parallel distributed processing execution server 120 that transmits the processing completion notification, and the process of the computer system 10 returns to step S103 of FIG. 2A (S114). In addition, the request for processing of the data block transferred to the parallel distributed processing execution server 120 includes a data block ID of a selected data block and a task and a task ID that executes the processing of the data block.

Further, steps S107 to S114 will be described below in detail.

<Data Information Management Table>

FIG. 3 is a diagram illustrating one example of the data information management table 300 according to the first embodiment of the present invention.

In the data information management table 300, the input data 1241 is constituted by multiple data blocks divided with a defined size, and as attribute information for managing each data block, and one entry is configured by a data block ID 301 for identifying each data block, a data arrangement server name 302, an allocation state 303 indicating whether processing of the data block is already allocated, and a processing state 304 indicting whether the processing of the data block is terminated.

The allocation state 303 column stores information such as "allocation completion", "unallocation", and the like, and the processing state 304 column stores information such as "processing completion", "unprocessed", and the like. The data arrangement server name 302 stores a name or an identifier of the parallel distributed processing execution server 120. In an example of the figure, a "server A" corresponds to the parallel distributed processing execution server 120-1 of FIG. 1A, and a "server B" corresponds to the parallel distributed processing execution server 120-1.

<Details (Allocation of Processing to Parallel Distributed Processing Execution Server) of S107 to S114>

Figure 4A:
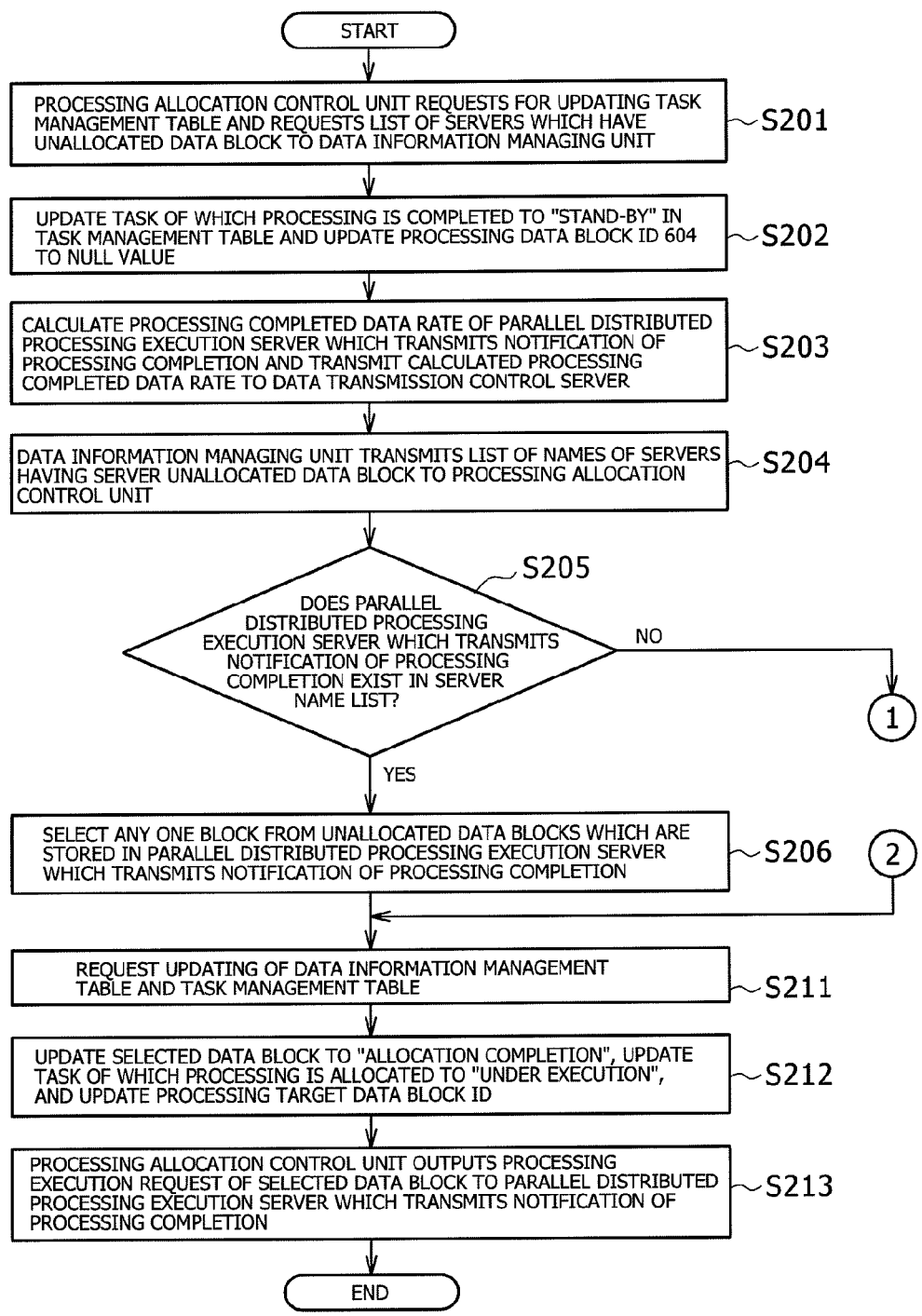
FIG. 4A is a flowchart illustrating one example of processing of allocating processing to a parallel distributed processing execution server 120 from step S107 to S114 of FIG. 2B according to the first embodiment of the present invention.
Figure 4B:
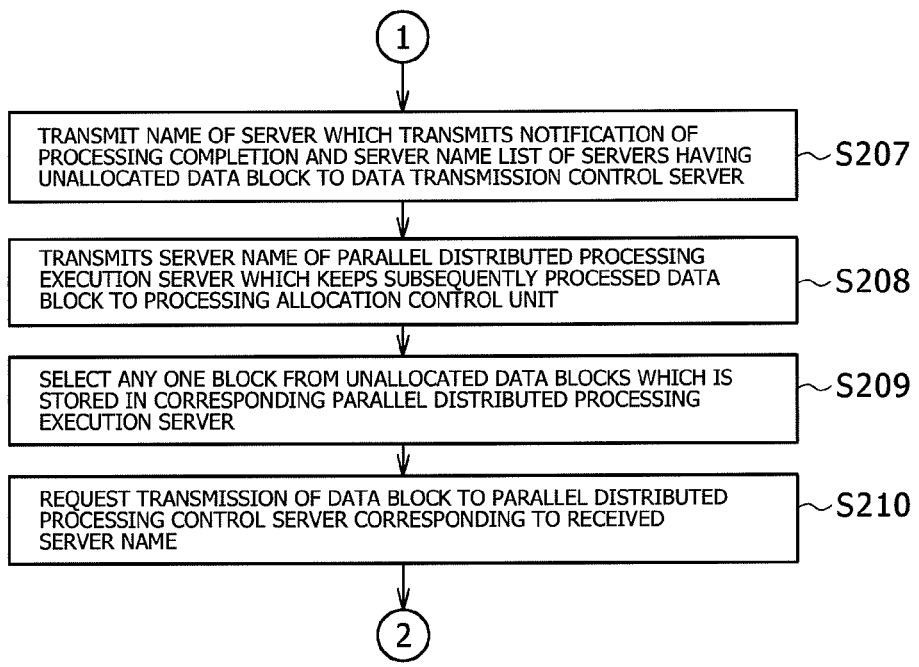
FIG. 4B is a flowchart illustrating one example of processing performed when a conditional branch in step S205 of FIG. 4A is NO according to the first embodiment of the present invention.

FIGS. 4A and 4B illustrate allocation processing of S116 of FIG. 2A and are flowcharts illustrating a detailed procedure regarding the allocation of the processing to the parallel distributed processing execution server 120 from step S107 to step S114 of FIG. 2B. Further, the processing of FIGS. 4A and 4B are performed by the processing allocation control unit 1331, the data information managing unit 1332, and the task managing unit 1334 on the parallel distributed processing control server 130.

First, the processing allocation control unit 1331 that receives the task ID as the processing completion notification from the parallel distributed processing execution server 120 requests for updating the task management table 600 to the task managing unit 1334. Further, the processing allocation control unit 1331 requests a server name list of the parallel distributed processing execution server 120 having an unallocated data block to the data information managing unit 1332 (S201).

Next, the task managing unit 1334 that receives the updating request from the task management table 600 updates an execution state 603 in a corresponding task to "stand-by" in the task management table 600 and updates a processing data block ID 604 to a NULL value (S202).

Subsequently, the data information managing unit 1332 calculates the processing completion data rate of the parallel distributed processing execution server 120 that transmits the processing completion notification with reference to the data information management table 300 and transmits the processing completion data rate of the data transfer control server 140 and the name of the parallel distributed processing execution server 120. The data transfer control server 140 that receives the processing completion data rate updates a processing completion data rate 802 of a processing situation management table 800 of the received server name (S203).

Further, a method of calculating the processing completion data rate is achieved in such a manner that the data information managing unit 1332 acquires a rate of the number of data blocks in which the processing state 304 of the data information management table 300 is "processing completion" for the number of data blocks stored in the parallel distributed processing execution server 120. That is, the processing completion data rate is a rate of data blocks in which processing is completed up to a current time for all data blocks stored in the parallel distributed processing execution server 120, and is calculated by Equation (1) below.

$$\text{Processing completed data rate} = \text{number of stored data blocks in which processing is completed} \div \text{number of stored data blocks} \quad (1)$$

Further, the data information managing unit 1332 prepares a server name list of the parallel distributed processing execution server 120 having a data block in which the allocation state 303 is "unallocation" with reference to the data information management table 300 and transmits the prepared server name list to the processing allocation control unit 1331 (S204).

The processing allocation control unit 1331 that receives the server name list of the parallel distributed processing execution server 120 having the unallocated data block determines whether the parallel distributed processing execution server 120 transmitting the processing completion notification exists in the list (S205).

As a result of the determination of step S205, when the parallel distributed processing execution server 120 transmitting the processing completion notification exists in the list (S205→Yes), the processing allocation control unit 1331 selects one predetermined data block from the unallocated data blocks stored in the parallel distributed processing execution server 120 transmitting the processing completion notification with reference to the data information management table 300 (S206).

As a result of the determination of step S205, when the parallel distributed processing execution server 120 transmitting the processing completion notification does not exist in the list (S205→No), the processing of FIG. 4B is performed. The processing allocation control unit 1331 requests, to the data transfer control server 140, the server name of the parallel distributed processing execution server 120 having the data block which the task of the parallel distributed processing execution server 120 transmitting the processing completion notification subsequently processes (S207). Further, the request of the server name includes the server name of the parallel distributed processing execution server 120 transmitting the processing completion notification and the server name list of the parallel distributed processing execution server 120 having the unallocated data block.

Next, the data transfer control server 140 extracts the parallel distributed processing execution server 120 storing the data block which the parallel distributed processing execution server transmitting the processing completion notification subsequently processes and transmits the extracted server to the processing allocation control unit 1331 of the parallel distributed processing control server 130 (S208). The processing of step S208 will be described in detail below.

Subsequently, the processing allocation control unit 1331 selects one predetermined data block from the unallocated data blocks stored in the parallel distributed processing execution server 120 corresponding to the server name received from the data transfer control server 140 (S209).

Further, the processing allocation control unit 1331 requests for executing transfer of the selected data block to the parallel distributed processing execution server 120 transmitting the processing completion notification, to the parallel distributed processing execution server 120 corresponding to the received server name (S210). In addition, the transfer request of the data block includes the data block ID of the selected data block and the server name of the parallel distributed processing execution server 120 transmitting the processing completion notification.

Further, the processing allocation control unit 1331 requests for updating of the data information management table 300 to the data information managing unit 1332 and requests for updating of the task management table 600 to the task managing unit 1334 (S211). In addition, the updating request of the data information management table 300 includes the data block ID 301 of the selected data block and the data arrangement server name 302, and the updating request of the task management table 600 includes a task ID 601 received from the parallel distributed processing execution server 120 as the processing completion notification and a processing data block ID 604 of the selected data block.

The data information managing unit 1332 updates the allocation state 303 of the data block corresponding to the data block ID 301 included in the received updating request to "allocation completion", and the task managing unit 1334 updates the execution state 603 of the task of the task management table 600 corresponding to the received task ID to "under execution" and updates the processing data block ID 604 to the received data block ID (S212).

Further, the processing allocation control unit 1331 transmits the processing execution request of the selected data block to the parallel distributed processing execution server 120 transmitting the processing completion notification (S213). In addition, the processing execution request includes the data block ID of the selected data block and the task ID to which the processing is allocated.

<Processing Execution Server Management Table>

Figure 5:
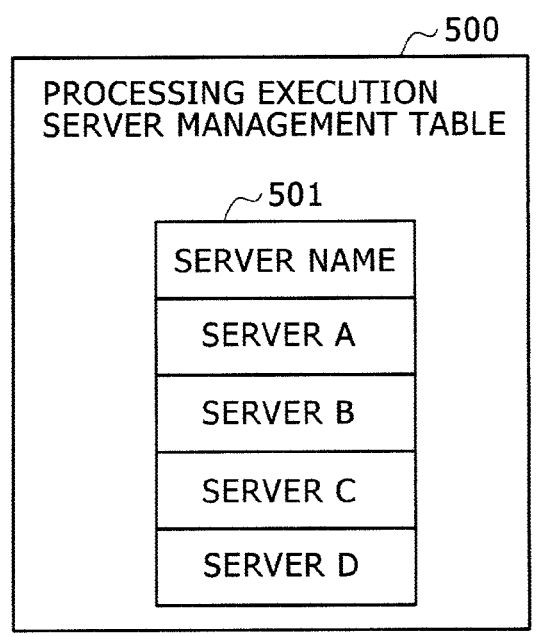
FIG. 5 is a diagram illustrating one example of a processing execution server management table according to the first embodiment of the present invention.

FIG. 5 is a diagram illustrating one example of the processing execution server management table 500 according to the first embodiment of the present invention.

The processing execution server management table 500 has information of a server name 501 for identifying each parallel distributed processing execution server 120 as attribute information to manage the parallel distributed processing execution server 120.

<Task Management Table>

FIG. 6 is a diagram illustrating one example of the task management table 600 managed by the task managing unit 1334 according to the first embodiment of the present invention.

In the task management table 600, as the attribute information to manage each task of the parallel distributed processing execution server 120, one entry is configured from a task ID 601 storing the identifier for identifying each task, a server name 602 storing a name or an identifier of the parallel distributed processing execution server 120 in which the task exists, an execution state 603 indicating whether the task is executing the processing, and a processing data block ID 604 indicating an identifier of a data block processed by the task. The execution state 603 column stores information such as "under execution", "stand-by", and the like.

<Details (Determination of Transmission Source Server of Data Block) of S208>

Figure 7A:
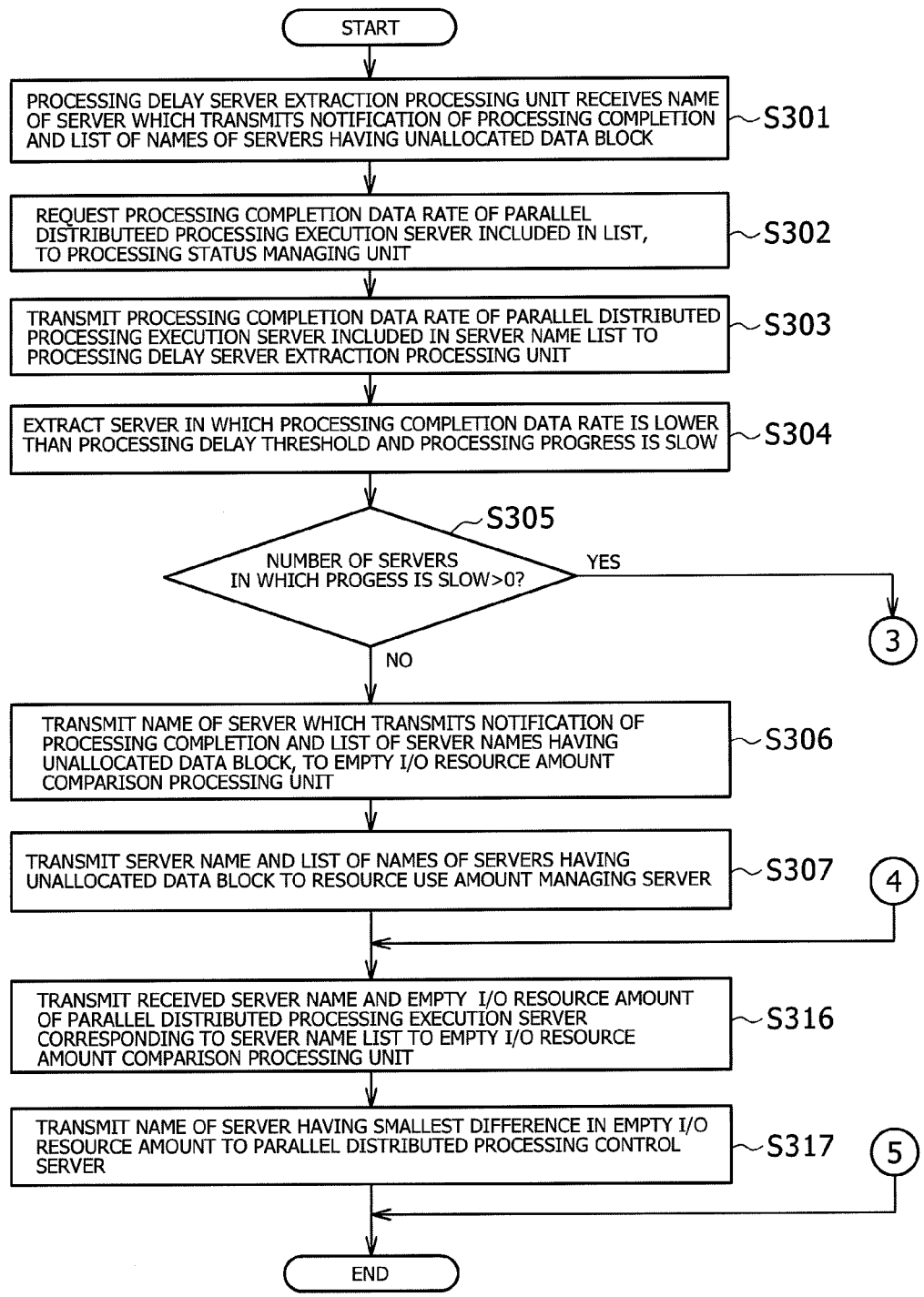
FIG. 7A is a flowchart illustrating detailed processing in step S208 of FIG. 4B.

FIGS. 7A and 7B are flowcharts illustrating a detailed processing procedure of step S208 of FIG. 4B. Further, the processing of FIGS. 7A and 7B is performed by a processing delay server extraction processing unit 1431, an empty I/O resource amount comparison processing unit 1432, and a processing situation managing unit 1433 on the data transfer control server 140.

In step S208, the data transfer control server 140 extracts the parallel distributed processing execution server 120 storing a data block which the parallel distributed processing execution server transmitting the processing completion notification subsequently processes and transmits the server name having the data block to the processing allocation control unit 1331 of the parallel distributed processing control server 130.

First, the processing delay server extraction processing unit 1431 of the data transfer control server 140 receives the server name of the parallel distributed processing execution server 120 transmitting the processing completion notification and the list of the server names of the parallel distributed processing executions servers 120 having unallocated data blocks, from the parallel distributed processing control server 130 (S301). The list of the server names is a server name list of the parallel distributed processing execution servers 120 having the unallocated data blocks generated by the processing allocation control unit 1331 in step S207 of FIG. 4B.

Next, the processing delay server extraction processing unit 1431 requests the processing completion data rate of the parallel distributed processing execution server 120 having the unallocated data block, to the processing situation managing unit 1433 (S302). Further, the request for the processing completion data rate includes the server name list of the parallel distributed processing execution servers 120 having the unallocated data blocks received by the processing delay server extraction processing unit 1431 of the data transfer control server 140 in step S203 of FIG. 4A.

Subsequently, the processing situation managing unit 1433 receiving the server name list extracts the processing completion data rate of the parallel distributed processing execution server 120 included in the server name list with reference to the processing situation management table 800, and transmits the processing completion data rate to the processing delay server extraction processing unit 1431 (S303).

Further, the processing delay server extraction processing unit 1431 acquires a processing delay threshold 1001 with reference to the processing delay threshold table 1000. The processing delay server extraction processing unit 1431 compares the processing completion data rate of the parallel distributed processing execution server 120 included in the server name list received from the parallel distributed processing control server 130 with the processing delay threshold 1001 to extract a parallel distributed processing execution server 120 in which the processing completion data rate is smaller than the processing delay threshold 1001 and the processing progress is slow (S304). In addition, the processing delay threshold 1001 is set by a user or manager in advance before executing the parallel distributed processing.

Subsequently, the processing delay server extraction processing unit 1431 determines whether the parallel distributed processing execution server 120 in which the processing progress is slow, which is extracted in step S304 exists (S305).

As a result of the determination of step S305, when the parallel distributed processing execution server 120 in which the processing progress is slow exists (S305→Yes), the processing delay server extraction processing unit 1431 determines whether the server number of the parallel distributed processing execution servers 120 in which the processing progress is slow is one (S308 of FIG. 7B).

As a result of the determination of step S308, when the server number of the parallel distributed processing execution servers 120 in which the processing progress is slow is one (S308→Yes), the processing delay server extraction processing unit transmits, to the parallel distributed processing control server 130, the server name of the parallel distributed processing execution server in which the processing progress is slow, as the transmission source server of the data block which the parallel distributed processing execution server 120 transmitting the processing completion notification subsequently processes (S315).

As a result of step S308, when the parallel distributed processing execution servers 120 in which the processing progress is slow are in plural (S308→No), the processing delay server extraction processing unit 1431 requests for execution multiplicity of the parallel distributed processing execution server 120 in which the processing progress is slow, to the processing situation managing unit 1433 (S309). The execution multiplicity of the parallel distributed processing execution server 120 represents the number of tasks which are executed simultaneously. In addition, in step S309, the execution multiplicity is handled as processing performance per unit time of each parallel distributed processing execution server 120. Further, the request for the execution multiplicity includes the server name list of the parallel distributed processing execution server 120 in which the processing progress is slow. Further, as a value representing the processing performance per unit time, a value representing a hardware specification such as processing performance or a memory capacity of a CPU may be used.

Subsequently, the processing situation managing unit 1433 receiving the execution multiplicity of the server in which the processing progress is slow acquires execution multiplicity 803 of each parallel distributed processing execution server 120 included in the server name list to transmit the acquired execution multiplicity to the processing delay server extraction processing unit 1431, with reference to the processing situation management table 800 (S311).

Further, the processing delay server extraction processing unit 1431 extracts a parallel distributed processing execution server 120 having lowest execution multiplicity as a processing delay server, from the parallel distributed processing execution servers 120 in which the processing progress is slow (S311).

Further, as the processing performance per unit time, when the hardware specification such as the processing performance of the CPU or the memory capacity is used, the processing delay server extraction processing unit 1431 extracts a parallel distributed processing execution server 120 having a lowest hardware specification as the processing delay server from the parallel distributed processing execution servers 120 in which the processing progress is slow.

FIG. 9 illustrates a modification of a processing situation management table, and instead of the execution multiplicity 803 of the processing situation management table 800 illustrated in FIG. 8, hardware specifications 903 to 905 are used.

In a processing situation management table 800' of FIG. 9, one entry is configured by a CPU type 903 storing a type of the CPU 122 of the parallel distributed processing execution server 120, the number 904 of cores of the CPU 122, and a memory type 905 storing a type of the main storage device 123, instead of the execution multiplicity 803 of the processing situation management table 800 illustrated in FIG. 8.

In the processing situation management table 800', a CPU type 903="CPU1" represents the CPU 122 having a high specification (high performance), a "CPU2" represents a CPU having a low specification, a "memory 1" of a memory type represents a memory having a high specification (high performance), a "memory 2" represents a memory having the low specification, and a parallel distributed processing execution server 120 having a lowest hard specification is a server D including the "CPU2" of a core 1 and the "memory 2" having the low specification Further, instead of the CPU type 903, the processing performance of the CPU may be represented by the number of operating clocks and the number of cores of the CPU 122, and a capacity of a cache.

Subsequently, the processing delay server extraction processing unit 1431 determines whether the number of processing delay servers extracted in step S311 is one (S312).

As a result of the determination of step S312, when the number of processing delay servers is one (S312→Yes), the processing of step S315 is performed to transmit the server name of the processing delay server to the parallel distributed processing control server 130 (S315).

As a result of the determination of step S312, when the number of processing delay servers is multiple (S312→No), the processing delay server extraction processing unit 1431 transmits the server name of the parallel distributed processing execution server 120 transmitting the processing completion notification, and the server name list of the processing delay server to the empty I/O resource amount comparison processing unit 1432 (S313).

Subsequently, the empty I/O resource amount comparison processing unit 1432 requests for the empty I/O resource amounts of the parallel distributed processing execution server 120 transmitting the processing completion notification and the processing delay server, to the resource use amount managing server 150 (S314). Further, the request for the empty I/O resource amount includes the server that includes the server name of the parallel distributed processing execution server 120 transmitting the processing completion notification and the server name list of the processing delay server.

As a result of step S305, when the parallel distributed processing execution server 120 in which the processing progress is slow does not exist (S305→No), the processing delay server extraction processing unit 1431 transmits the server name of the parallel distributed processing execution server 120 transmitting the processing completion notification and the server name list of the parallel distributed processing execution server 120 having the unallocated data block, to the empty I/O resource amount comparison processing unit 1432 (S306).

Further, the empty I/O resource amount comparison processing unit 1432 transmits the server name lists of the parallel distributed processing execution server 120 transmitting the processing completion notification to the resource use amount managing server 150 and the parallel distributed processing execution server 120 having the unallocated data block, and requests for the empty I/O resource amount of each parallel distributed processing execution server 120 (S307). In addition, the request for the empty I/O resource amount includes the server name of the parallel distributed processing execution server transmitting the processing completion notification and the server name list of the parallel distributed processing execution server 120 having the unallocated data block.

Next, the resource use amount managing server 150 transmits the empty I/O resource amounts of the parallel distributed processing execution server 120 transmitting the processing completion notification and the parallel distributed processing execution server 120 included in the server name list to the empty I/O resource amount comparison processing unit 1432 from the data transfer control server 140 (S316 of FIG. 7A). Further, the empty I/O resource amounts include an empty I/O resource amount of a network I/O and an empty I/O resource amount of a disk I/O. The processing of step S316 will be described in detail below.

Further, the empty I/O resource amount comparison processing unit 1432 compares the empty I/O resource amount of the parallel distributed processing execution server 120 transmitting the processing completion notification and the empty I/O resource amount of each parallel distributed processing execution server 120 to extract a parallel distributed processing execution server 120 in which a difference in the empty I/O resource amount is the smallest as the transmission source server of the data block which the parallel distributed processing execution server 120 transmitting the processing completion notification subsequently processes. The empty I/O resource amount comparison processing unit 1432 transmits the server name of the extracted parallel distributed processing execution server 120 to the parallel distributed processing control server 130 (S317).

Further, a method of comparing the empty I/O resource amounts is achieved by acquiring an absolute value of the difference in empty resource amount of the disk I/O and an absolute value of the difference in empty resource amount of the network I/O, and acquiring the larger absolute value of the difference between the respective empty resource amounts in the empty I/O resource amount comparison processing unit 1432. That is, the difference in empty I/O resource amount is calculated by Equation (2) below.

$$\text{Difference in empty I/O resource amount} = \max\{|\text{difference in empty resource amount of disk I/O}| \text{ and } |\text{difference in empty resource amount of network I/O}|\} \quad (2)$$

Further, as a variation of extraction of the transmission source server of the data block which the parallel distributed processing execution server 120 transmitting the processing completion notification subsequently processes, in order to use the empty I/O resource amount of the parallel distributed processing execution server transmitting the processing completion notification for transferring the data block as possible, the parallel distributed processing execution server in which the difference in empty I/O resource amount is the smallest may be extracted from parallel distributed processing execution servers 120 having the larger empty I/O resource amount than the parallel distributed processing execution server 120 transmitting the processing completion notification in the empty I/O resource amounts of the disk I/O and the network I/O.

<Processing Situation Management Table>

FIG. 8 is a diagram illustrating one example of the processing execution server management table 800 according to the first embodiment of the present invention. FIG. 9 illustrates a modification of a processing situation management table, and instead of the execution multiplicity 803 of the processing situation management table 800 illustrated in FIG. 8, hardware specifications 903 to 905 are used.

Herein, FIG. 8 illustrates a case in which execution multiplicity is used as processing performance per unit time of the parallel distributed processing execution server 120, and FIG. 9 illustrates a case in which a specification of hardware such as a CPU or a memory is used as the processing performance per unit time of the parallel distributed processing execution server.

The processing situation management table 800, as attribute information to manage a processing progress situation of each parallel distributed processing execution server 120, includes a server name 801 for identifying each parallel distributed processing execution server 120, a processing completion data rate 802 representing a rate of the processing completed data block to the data block stored in each parallel distributed processing execution server, and execution multiplicity 803 representing processing performance per unit time of each parallel distributed processing execution server 120.

In the processing situation management table 800' of FIG. 9, the execution multiplicity 803 is deleted from the processing situation management table 800, and each information on a CPU type 903 representing a specification name of a CPU, a CPU core number 904, and a memory type 905 representing a specification name of the memory is added as the processing performance per unit time of each parallel distributed processing execution server 120.

<Processing Delay Threshold Management Table>

Figure 10:
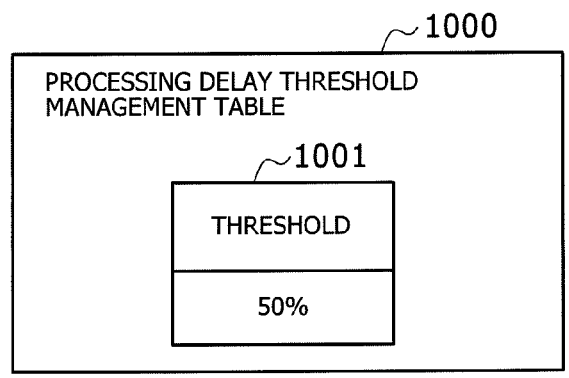
FIG. 10 is a diagram illustrating an example of a processing delay threshold management table according to the first embodiment of the present invention.

FIG. 10 is a diagram illustrating one example of a processing delay threshold management table according to the first embodiment of the present invention.

The processing delay threshold management table 1000 includes, as attribute information to manage a reference for determining whether the processing progress of each parallel distributed processing execution server 120 is delayed, information on a threshold for determining whether the processing completion data rate of the parallel distributed processing execution server 120 is small and processing is delayed.

<Details (Acquisition of Empty I/O Resource Amount) of S316>

Figure 11:
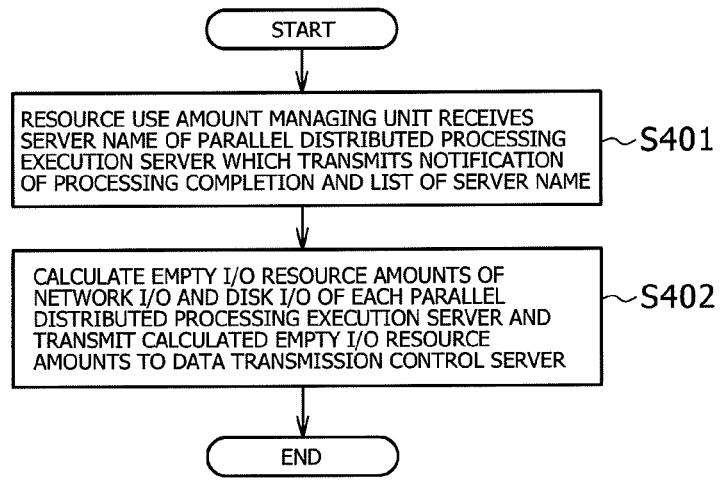
FIG. 11 is a flowchart illustrating a detailed procedure of processing in step S316 of FIG. 7A according to the first embodiment of the present invention.

FIG. 11 is a flowchart illustrating a detailed processing procedure of step S316 of FIG. 7A. Further, the processing of FIG. 11 is performed by the resource use amount managing unit 1531 on the resource use amount managing server 150.

First, the resource use amount managing unit 1531 receives the server name of the parallel distributed processing execution server 120 transmitting the processing completion notification and the server name list from the data transfer control server 140 (S401).

Subsequently, the resource use amount managing unit 1531 calculates the empty I/O resource amount of the network I/O and the empty I/O resource amount of the disk I/O of each parallel distributed processing execution server 120 with reference to the resource use amount management table 1200, and transmits the calculated empty I/O resource amounts to the data transfer control server 140 (S316).

<Resource Use Amount Management Table>

FIG. 12 is a diagram illustrating one example of the resource use amount management table 1200 according to the first embodiment of the present invention.

The resource use amount management table 1200 includes, as attribute information to manage the I/O resource use amount of each parallel distributed processing execution server 120, each information on a server name 1201 for identifying each parallel distributed processing execution server 120, a network I/O use amount 1202, and a disk I/O use amount 1203.

Further, in the resource use amount management table 1200, a network I/O use amount and a disk I/O use amount are represented as a rate of a used bandwidth to a total I/O bandwidth of each parallel distributed processing execution server, but the used I/O bandwidth may be used as it is.

<Conceptual Diagram of Selection of Parallel Distributed Processing Execution Server as Transmission Source of Data Block>

Next, referring to FIG. 13, the first embodiment of the present invention will be described, and a concept of processing of selecting the parallel distributed processing execution server 120 as the transmission source of the data block will be described.

Figure 13:
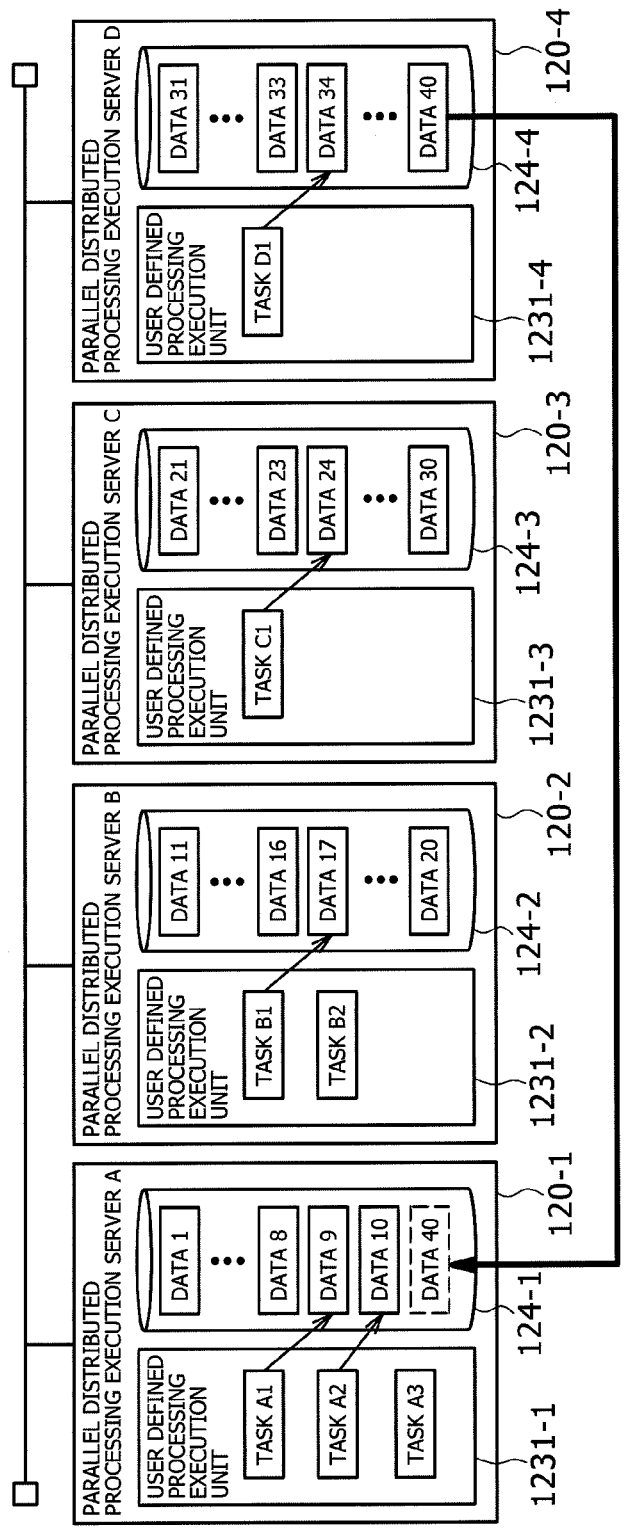
FIG. 13 is a block diagram illustrating one example of selection of a parallel distributed processing execution server which is a transmission source of a data block when processing of a data block stored in another parallel distributed processing execution server 120 is allocated according to the first embodiment of the present invention.

FIG. 13 illustrates an example of selecting the transmission source server of the data block when a parallel distributed processing control server 130 receives a processing completion notification of a task A3 from a parallel distributed processing execution server A under an environment in which four parallel distributed processing execution servers 120-1 to 120-4 are operated. Further, the parallel distributed processing execution server 120-1 is represented as a parallel distributed processing execution server A, and the parallel distributed processing execution servers 120-2 to 120-4 are represented as execution servers B to D.

In FIG. 13, an unprocessed data block still exists and allocation of all data blocks 1 to 10 stored in the parallel distributed processing execution server A transmitting the processing completion notification is completed, based on the data information management table 300.

The processing allocation control unit 1331 acquires a server name list of "server B, server C, and server D" of the parallel distributed processing execution servers 120 having the unallocated data blocks from the data information managing unit 1332 and verifies that the unallocated data block does not exist in the parallel distributed processing execution server A transmitting the processing completion notification. Subsequently, the processing allocation control unit 1331 transmits the server name "server A" of the parallel distributed processing execution server 120 transmitting the processing completion notification to the data transfer control server 140, and a server name list of "server B, server C, and server D" of the parallel distributed processing execution servers 120 having unallocated data blocks 20, 30, and 40.

Next, the processing delay server extraction processing unit 1431 of the data transfer control server 140 acquires the processing completion data rates of the parallel distributed processing execution servers B, C, and D included in the received server name list from the processing situation managing unit 1433. In addition, the threshold stored in the processing delay threshold management table 1000, and the processing completion data rates of the respective parallel distributed processing executions servers B, C, and D are compared with each other, respectively. As a comparison result, the parallel distributed processing execution servers C and D in which the processing completion data rate is lower than a threshold 50% are extracted as the parallel distributed processing execution server 120 in which the processing progress is low, the server name list "server C and server D" of the extracted parallel distributed processing execution server 120 is transmitted to the processing situation managing unit 1433, and execution multiplicities of the respective parallel distributed processing execution servers 120 are acquired.

In addition, since the execution multiplicities of both the parallel distributed processing execution servers C and D are 1 by comparing the execution multiplicities of the respective parallel distributed processing execution servers 120, and the parallel distributed processing execution servers C and D are extracted as the processing delay server and transmitted to the empty I/O resource amount comparison processing unit 1432 together with the server name of the parallel distributed processing execution server A transmitting the processing completion notification.

Subsequently, the empty I/O resource amount comparison processing unit 1432 acquires the empty I/O resource amounts of the parallel distributed processing execution server A transmitting the processing completion notification and the processing delay servers B and C, from the resource use amount managing server 150. In addition, the empty I/O resource amounts of the parallel distributed processing execution server A transmitting the processing completion notification, and the respective processing delay servers B and C are compared with each other. As the comparison result, a difference in empty I/O resource amount between the parallel distributed processing execution server A and the parallel distributed processing execution server C is 30%, a difference in empty I/O resource amount between the parallel distributed processing execution server A and the parallel distributed processing execution server D is 5%, and the empty I/O resource amount comparison processing unit 1432 selects the parallel distributed processing execution server D in which the difference in empty I/O resource amount is small as the transmission source server of the data block. Subsequently, the empty I/O resource amount comparison processing unit 1423 transmits the server name "server D" of the selected parallel distributed processing execution server 120, to the parallel distributed processing control server 130.

The processing allocation control unit 1331 of the parallel distributed processing control server 130 receiving the server name "server D" selects "data 40" from the unallocated data blocks stored in the parallel distributed processing execution server D and requests for transferring the "data 40" to the parallel distributed processing execution server A with respect to the parallel distributed processing execution server D. In addition, the processing allocation control unit 1331 transmits a request for executing processing of the transferred data block "data 40" in the task A3, to the parallel distributed processing execution server A.

<Summary>

As described above, according to the first embodiment, even in a parallel distributed processing system in which a computer resource which is usable while executing the parallel distributed processing is changed and the execution multiplicity of the parallel distributed processing is changed, when processing of a data block stored in another parallel distributed processing execution server is allocated to a predetermined parallel disturbed processing execution server, a server in which the processing progress is slow is extracted from the processing progress situation of each parallel distributed processing execution server and data processing performance per unit time, empty I/O resource amounts of the extracted parallel distributed processing execution server and a parallel distributed processing execution server that allocates processing of the data block are compared with each other and thus, the parallel distributed processing execution server in which the difference is the smallest is selected as the transmission source server of the data block to reduce the number of data transfer times and shorten a data transfer time, thereby efficiently executing the entire parallel distributed processing.

Further, in the first embodiment, as an example of selecting a parallel distributed processing execution server 120 in which performance is lowest in the processing of step S311 of FIG. 7B, the execution multiplicity is used, but the parallel distributed processing execution server 120 in which the hardware specification is lowest may be selected as a computer having lowest processing performance by using the value of the hardware specification as described above.

Further, as the processing performance per unit time, when the hardware specification such as the processing performance of the CPU or the memory capacity is used, the processing delay server extraction processing unit 1431 may extract a parallel distributed processing execution server 120 having a lowest hardware specification as the processing delay server from the parallel distributed processing execution servers 120 in which the processing progress is slow.

Further, the determination of the processing delay server is not limited to the processing completion data rate and the threshold 1001, and even though a predetermined time elapsed from a processing (task) execution start, the parallel distributed processing execution server 120 that does not transmit the processing completion notification may be set as the processing delay server. Besides, in the determination of the processing delay server, an unprocessed rate of the data block after a predetermined time elapsed and a threshold may be compared with each other.

Further, the empty I/O resource amount is represented as the rate between the actual use amount and the theoretical value of the empty I/O resource amount, but a value acquired by multiplying the effective value of the network interface 121 or the secondary storage device 124, or the theoretical value by a predetermined rate may be used. That is, empty I/O resource amount of the network I/O=(effective value−current use band) effective value. Further, data transfer speed (MByte/sec) which is usable in the secondary storage device 124 may be represented as empty I/O resource amount of disk I/O=(effective value−current use band) effective value. In addition, instead of the effective value, a value acquired by multiplying a predetermined rate by the theoretical value may be used.

<Second Embodiment>

Next, a second embodiment of the present invention will be described with reference to FIGS. 14A to 18.

In the first embodiment, each parallel distributed processing execution server 120 is operated as one physical server, and when processing of the data block stored in another parallel distributed processing execution server 120 is allocated to a predetermined parallel distributed processing execution server 120, the transmission source server of the data block is selected based on processing progress rate of each parallel distributed processing execution server 120 and the empty resource amount. However, when multiple parallel distributed processing execution servers 120 is executed on the physical server as a virtual server, data transfer between the parallel distributed processing execution servers 120 which are operated on the same physical server does not require transmission of data via the network 100 but communicate with each other in the physical server, and as a result, the above data transfer may be less than, in transmission time of the data block, data transfer between the parallel distributed processing execution servers 120 which are operated on other physical servers.

Therefore, in the second embodiment, under an environment in which the multiple parallel distributed processing execution servers 120 is operated on the physical server as the virtual server, when processing of the data block stored in another parallel distributed processing execution server 120 is allocated to a predetermined parallel distributed processing execution server 120, the transmission source server of the data block is first selected from the parallel distributed processing execution servers 120 which are operated on the same physical server and thereafter, the parallel distributed processing execution server 120 is selected as the transmission source server of the data block, based on the processing progress rate of each parallel distributed processing execution server 120 and the empty resource amount.

<System Configuration>

Figure 14A:
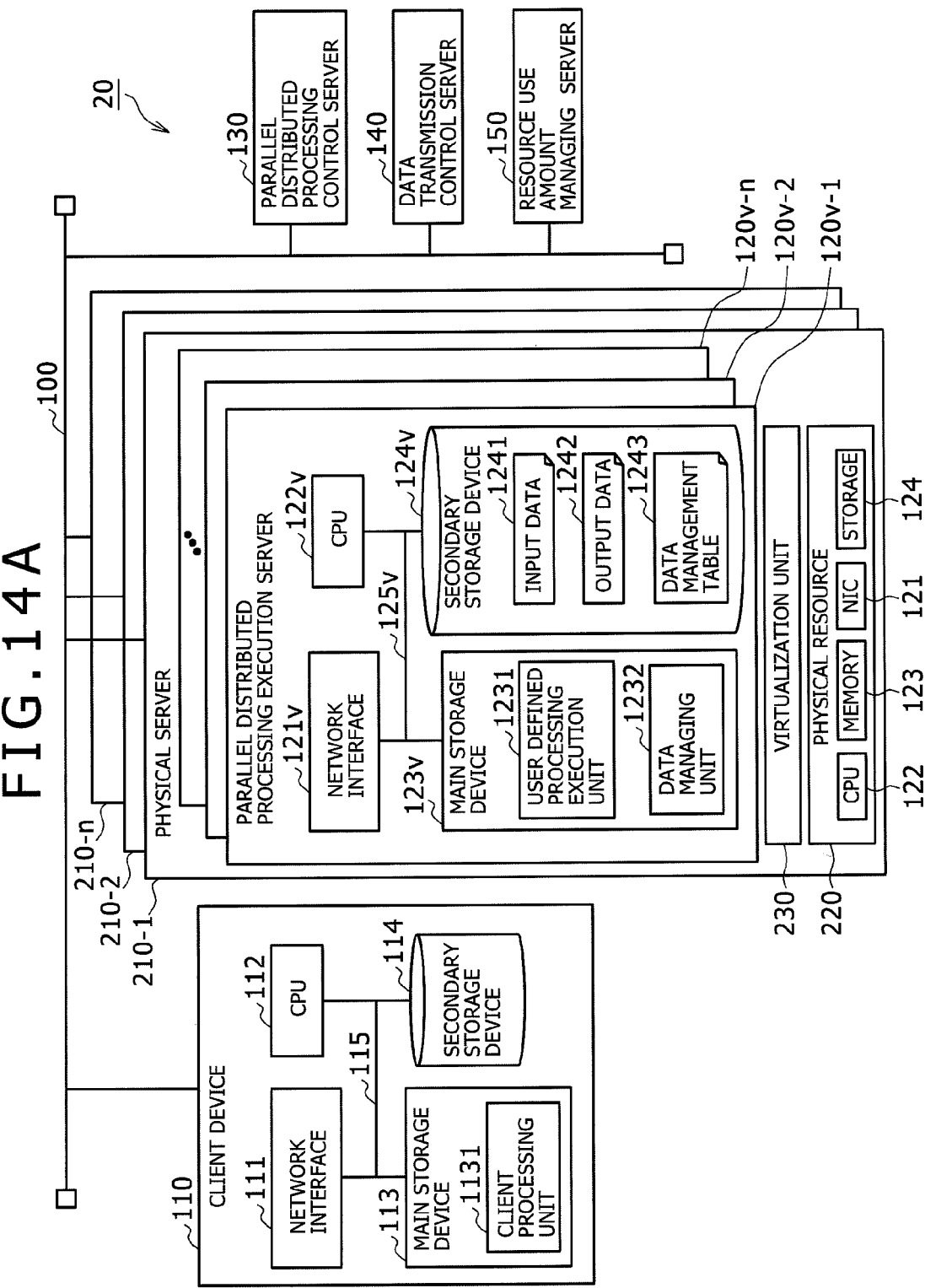
FIG. 14A is a block diagram illustrating one example of a configuration of a computer system according to a second embodiment of the present invention.

FIGS. 14A and 14B are block diagrams illustrating one example of a configuration of the computer system 20 according to the second embodiment of the present invention.

In the computer system 20 illustrated in FIGS. 14A and 14B, the parallel distributed processing execution server 120 is executed by a physical server 210-1 as the virtual server that executes the parallel distributed processing. A collective term of physical servers 210-1 to 210-n is a physical server 210.

In the physical server 210, a virtualization unit 230 executed on a physical resource 220 provides multiple virtual servers and each virtual server is executed as the parallel distributed processing execution server 120. The virtualization unit 230 is constituted by a hypervisor that allocates the physical resource 220 to the multiple parallel distributed processing execution servers 120 or a virtual machine monitor (VMM). The physical resource 220 is constituted by a CPU 122, a main storage device 123, a network interface 121, and a secondary storage device 124.

The virtualization unit 230 provides a virtual (or logical) CPU 122v, a virtual main storage device 123v, a virtual network interface 121v, and a virtualized secondary storage device 124v, to each parallel distributed processing execution server 120.

Functional components of each parallel distributed processing execution server 120 are the same as those of the first embodiment. Further, the parallel distributed processing control server 130, the data transfer control server 140, and the resource use amount managing server 150 are also configured similarly to the first embodiment. However, a processing execution server management table 1700 and a processing situation management table 1800 are different from those of the first embodiment in that a correspondence relationship between the physical server 210 and the virtual server is added to the configuration of the first embodiment.

<Overall Processing>

Figure 15B:
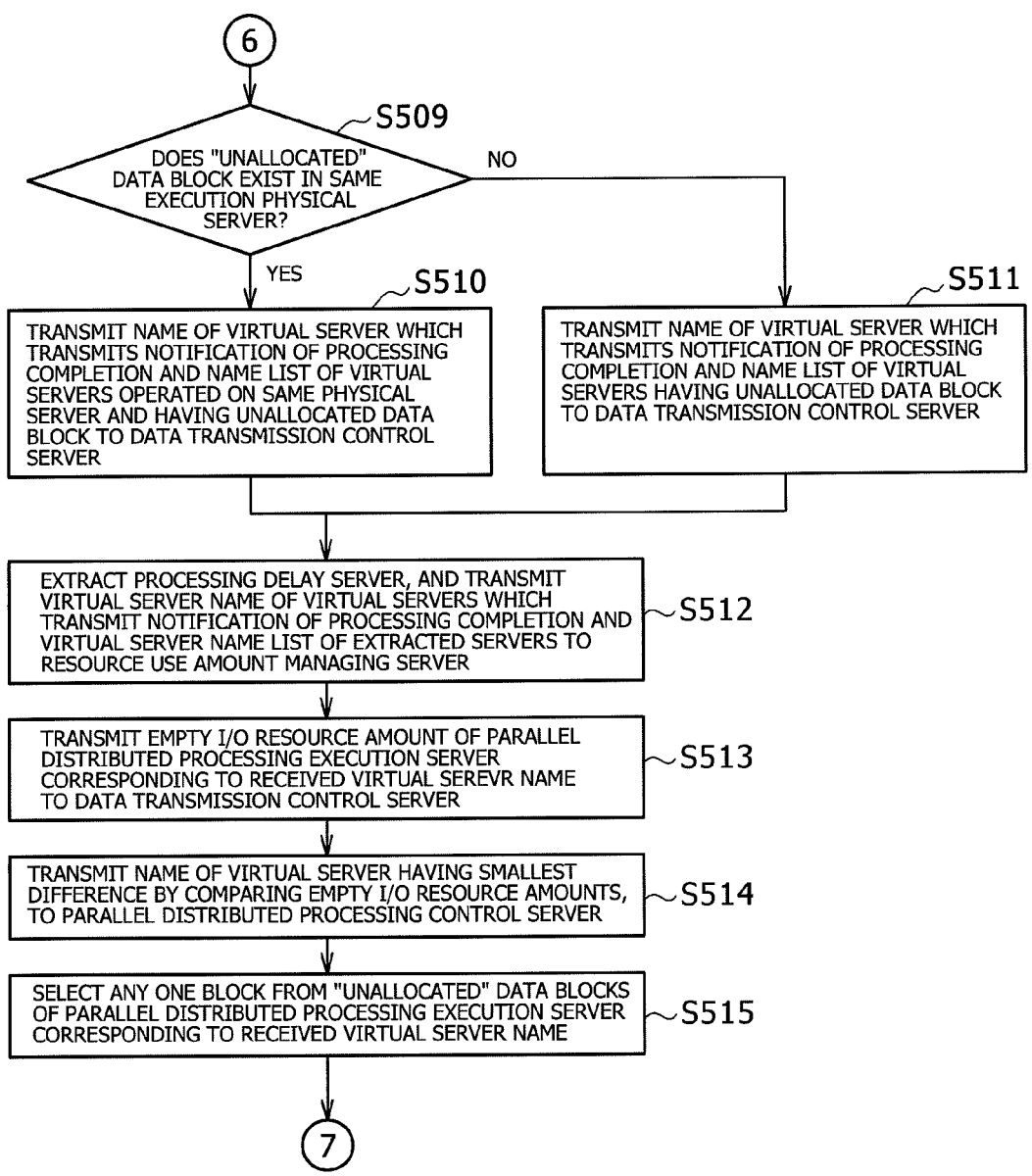
FIG. 15B is a flowchart illustrating one example of processing performed when a conditional branch in step S507 of FIG. 15A is NO according to the second embodiment of the present invention.

FIGS. 15A and 15B are flowchart illustrating a procedure of overall processing regarding a method of executing parallel distributed processing according to a second embodiment. Further, FIGS. 15A and 15B illustrate processing corresponding to FIGS. 2A and 2B of the first embodiment.

First, a request for data loading of processing target data (input data 1241) is transferred from the client device 110 to the parallel distributed processing control server 130. The parallel distributed processing control server 130 that receives the request for data loading divides the load target data into data blocks (input data 1241) having a defined size, and distributes and loads the divided data blocks to multiple parallel distributed processing execution servers 120 (S501).

Next, a request for executing the parallel distributed processing is transmitted from the client device 110 to the parallel distributed processing control server 130. The processing allocation control unit 1331 of the parallel distributed processing control server 130 that receives the request for executing the parallel distributed processing transmits a request for processing execution of the loaded data blocks, to each parallel distributed processing execution server 120 and the data information managing unit 1332 updates an allocation state 303 of a data block which is a processing target of the data information management table 300 to "allocation completion" (S502). Further, the processing execution request of the data block which is transferred by the processing allocation control unit 1331 includes a data block ID of the processing target data block and a task ID of a task that executes the processing of each data block. In addition, herein, the task is a program that executes predetermined processing of the processing target data block as the input data 1241.

Subsequently, the user defined processing execution unit 1231 of the parallel distributed processing execution server 120 that receives the processing execution request executes predetermined processing by using a data block designated by the processing execution request in each task as the input data 1241 (S503). That is, the user defined processing execution unit 1231 of the parallel distributed processing execution server 120 starts the task designated by the processing execution request and allocates the data block designated by the processing execution request to each task as the input data 1241 to execute processing.

The parallel distributed processing execution server 120 transmits a task ID of a task of which processing is completed as a processing completion notification to the parallel distributed processing control server 130 from the parallel distributed processing execution server 120 when processing of the data block designated as the input data 1241 is completed with respect to the allocated task (S504).

Further, the data information managing unit 1332 of the parallel distributed processing control server 130 that receives the processing completion notification updates the processing state 304 of the corresponding data block ID 301 of the data information management table 300 to "processing completion" (S505).

Subsequently, the processing allocation control unit 1331 of the parallel distributed processing control server 130 determines whether the processing states 304 of all of the data blocks are "processing completion" with reference to the data information management table 300 (S506).

As a result of the determination of step S506, when all of the data blocks are in "processing completion" (S506→Yes), the processing allocation control unit 1331 of the parallel distributed processing control server 130 transmits a notification of parallel distributed processing completion to the client device 110, and the computer system 10 terminates the processing.

As a result of the determination of step S506, when any one data block is not in "processing completion" (S506→No), the parallel distributed processing control server 130 determines whether a data block in which an allocation state 403 is "unallocated" exists in the parallel distributed processing execution server 120 transmitting the processing completion notification with reference to the data information management table 300 (S507).

As a result of the determination of step S507, when the unallocated data block exists in the parallel distributed processing execution server 120 that transmits the processing completion notification (S507→Yes), the processing allocation control unit 1331 of the parallel distributed processing control server 130 selects one predetermined data block from unallocated data blocks which exist in the parallel distributed processing execution server 120 that transmits the processing completion notification (S508).

As the result of the determination of step S507, when the unallocated data block does not exist in the parallel distributed processing execution server 120 that transmits the processing completion notification (S507→No), the process proceeds to FIG. 15B. In FIG. 15B, the parallel distributed processing control server 130 determines whether a data block where the allocation state 303 is "unallocated" exists in another parallel distributed processing execution server 120 on the physical server 210 where the parallel distributed processing execution server 120 transmitting the processing completion notification is operated, with reference to the data information management table 300 (S509). That is, a virtual server having an unallocated data block is extracted on the same physical server 210.

As a result of the determination of step S509, when the unallocated data block exists (S509→Yes), the parallel distributed processing control server 130 transmits a virtual server name of the parallel distributed processing execution server 120 that transmits the processing completion notification and a virtual server name list of the parallel distributed processing execution server 120 that is operated on the same physical server as the parallel distributed processing execution server 120 and stores the unallocated data block, to the data transfer control server 140 (S510).

As the result of the determination of step S509, when the unallocated data block does not exist on the same physical server 210 (S509→No), the processing allocation control unit 1331 of the parallel distributed processing control server 130 transmits the virtual server name of the parallel distributed processing execution server 120 transmitting the processing completion notification and the virtual server name list of the parallel distributed processing execution server 120 having the unallocated data block to the data transfer control server 140 (S511).

Next, the processing delay server extraction processing unit 1431 of the data transfer control server 140 extracts a processing delay server from the parallel distributed processing execution server 120 included in the server name list having the unallocated data block received from the parallel distributed processing control server 130, transmits the virtual server name of the parallel distributed processing execution server 120 transmitting the processing completion notification and the virtual server name list of the extracted server, to the resource use amount managing server 150, and requests for the empty I/O resource amount of each parallel distributed processing execution server 120 (S512).

Subsequently, the resource use amount managing unit 1531 of the resource use amount managing server 150 transmits the empty I/O resource amounts of the parallel distributed processing execution server 120 that transmits the processing completion notification and the parallel distributed processing execution server 120 included in the virtual server name list and transmits the acquired empty I/O resource amount, to the data transfer control server 140 with reference to the resource use amount management table 1200 (S513). Further, the empty I/O resource amounts are the same as those of the first embodiment, and include an empty I/O resource amount of a network I/O and an empty I/O resource amount of a disk I/O.

Further, the empty I/O resource amount comparison processing unit 1432 of the data transfer control server 140 compares the empty I/O resource amount of the parallel distributed processing execution server 120 that transmits the processing completion notification and the empty I/O resource amount of each processing delay server to extract a processing delay server in which a difference in the empty I/O resource amount is the smallest and transmit a virtual server name of the extracted processing delay server to the parallel distributed processing control server 130 (S514).

Next, the processing allocation control unit 1331 of the parallel distributed processing control server 130 selects one predetermined data block from the unallocated data blocks which exist in the parallel distributed processing execution server 120 corresponding to the virtual server name received from the data transfer control server 140 (S515).

Further, the data information managing unit 1332 of the parallel distributed processing control server 130 updates the allocation state 303 of the selected data block to "allocation completion" in the data information management table 300. Further, the processing allocation control unit 1331 transmits the processing request of the selected data block to the parallel distributed processing execution server 120 transmitting the processing completion notification, and the computer system 20 returns the processing to step S503 (S516). In addition, the request for processing the data block includes a data block ID of the selected data block and a task and a task ID that executes the processing of the data block.

Further, steps S507 to S516 will be described below in detail.

<Details (Allocation of Processing to Parallel Distributed Processing Execution Server) of S507 to S516>

Figure 16A:
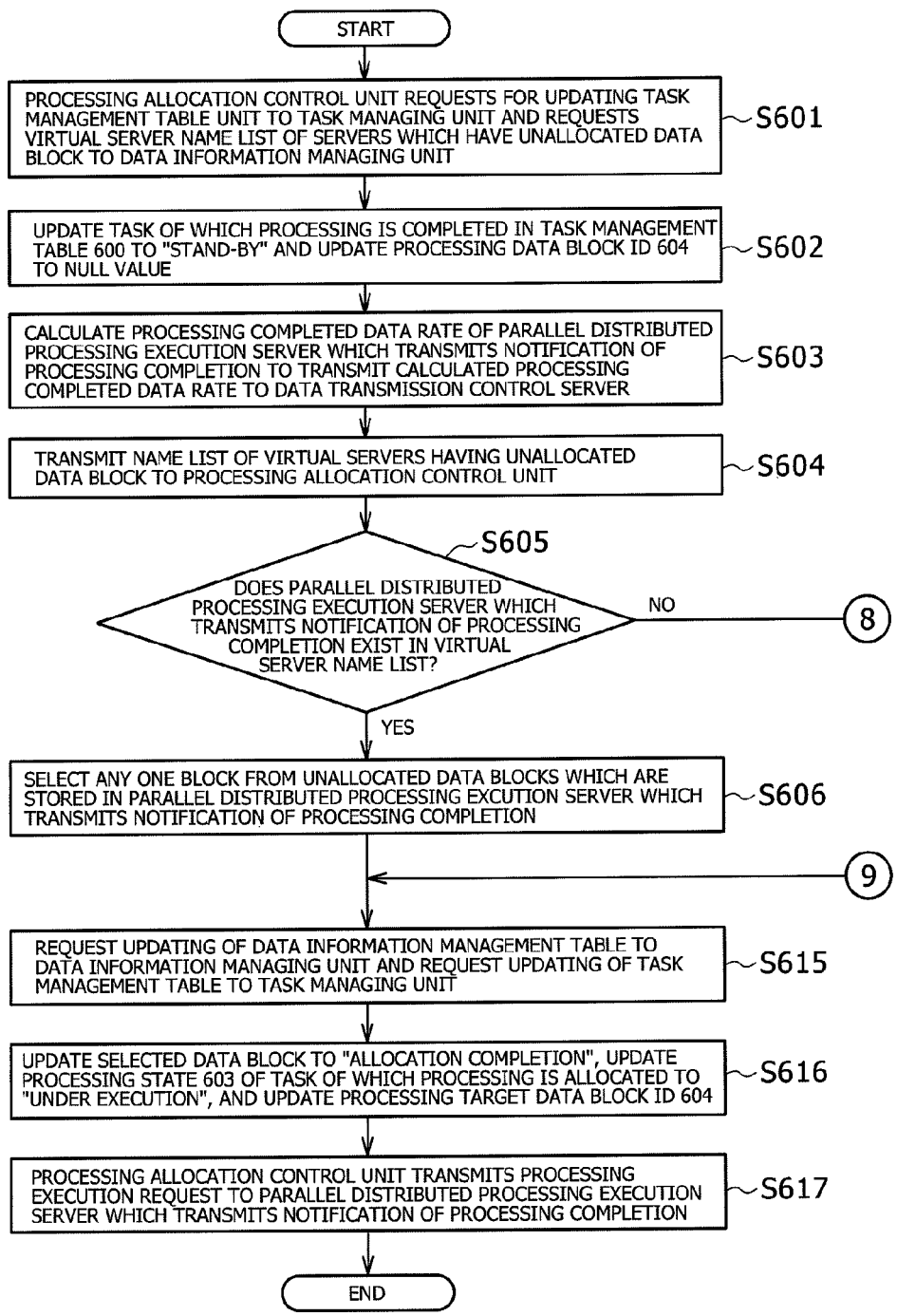
FIG. 16A is a flowchart illustrating a detailed procedure regarding allocation of processing to a parallel distributed processing execution server 120 of steps S507 to S516 of FIG. 15A.
Figure 16B:
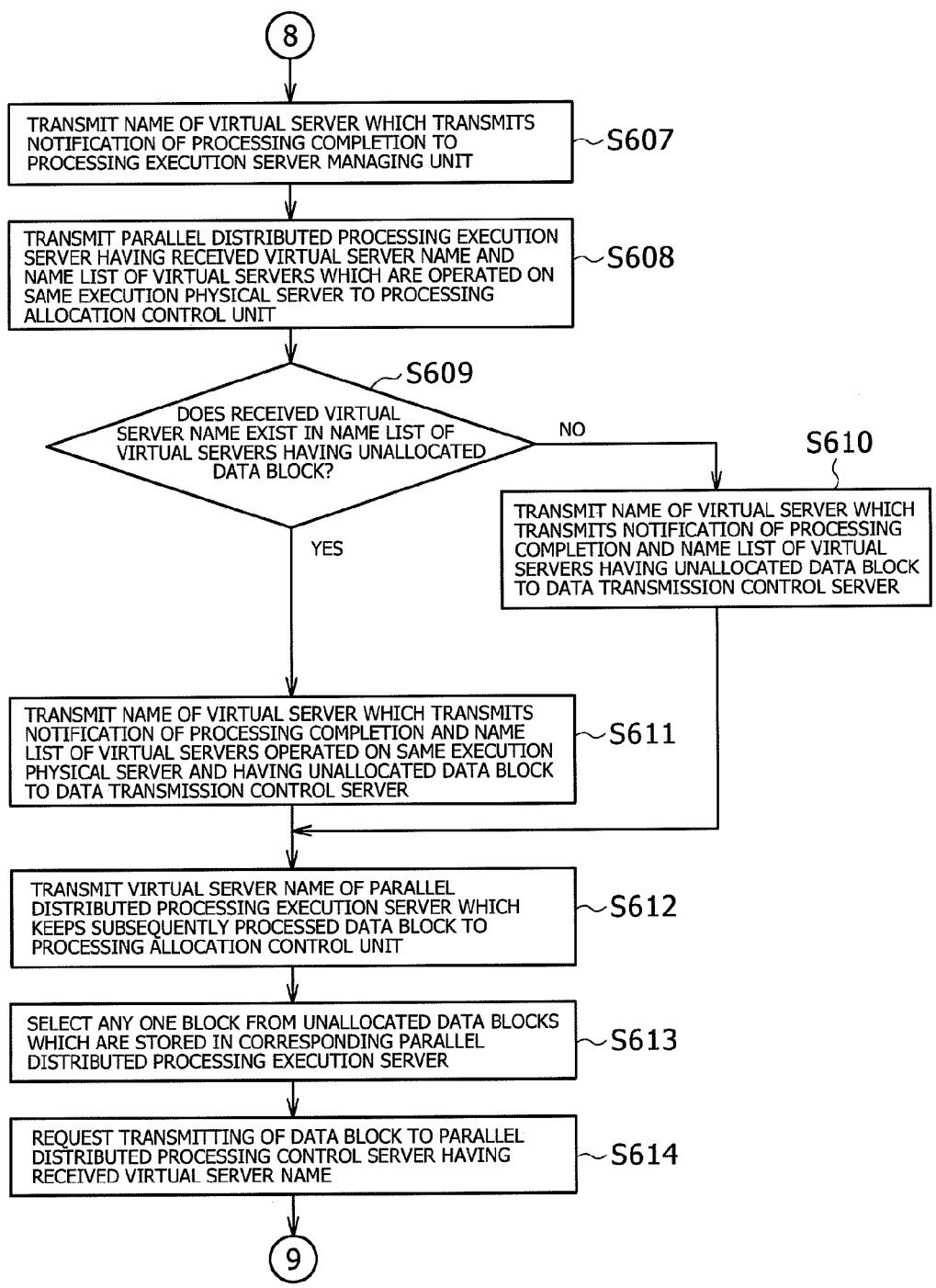
FIG. 16B is a flowchart illustrating one example of processing performed when a conditional branch in step S605 of FIG. 16A is NO.

FIGS. 16A and 16B are flowcharts illustrating a detailed procedure regarding allocation of processing to the parallel distributed processing execution server 120 of steps S507 to S516 illustrated in FIGS. 15A and 15B. Further, the processing of FIGS. 16A and 16B are performed by the processing allocation control unit 1331, the data information managing unit 1332, and the task managing unit 1334 on the parallel distributed processing control server 130, and correspond to the processing of FIGS. 4A and 4B of the first embodiment.

First, the processing allocation control unit 1331 that receives the task ID as the processing completion notification from the parallel distributed processing execution server 120 requests for updating the task management table 600 to the task managing unit 1334. Further, the processing allocation control unit 1331 requests a virtual server name list of the parallel distributed processing execution server 120 having an unallocated data block to the data information managing unit 1332 (S601).

Next, the task managing unit 1334 that receives the updating request from the task management table 600 updates an execution state 603 of the corresponding task to "stand-by" in the task management table 600 and updates a processing data block ID 604 to a NULL value (S602).

Subsequently, the data information managing unit 1332 calculates the processing completion data rate of the parallel distributed processing execution server 120 that transmits the processing completion notification with reference to the data information management table 300 and transmits the processing completion data rate and the name of the parallel distributed processing execution server 120, to the data transfer control server 140. The data transfer control server 140 that receives the processing completion data rate updates a processing completion data rate 1803 from a processing situation management table 1800 of the received virtual server name (S603). Further, a method of calculating the processing completion data rate is the same as that of the first embodiment, and is achieved in such a manner that the data information managing unit 1332 acquires a rate of the number of data blocks in which the processing state 304 of the data information management table 300 is "processing completion" to the number of data blocks stored in the parallel distributed processing execution server 120. That is, the processing completion data rate is a rate of data blocks in which processing is completed up to a current time to all data blocks stored by the parallel distributed processing execution server 120, and is calculated by Equation (1) described in the first embodiment.

Further, the data information managing unit 1332 prepares a virtual server name list of the parallel distributed processing execution server 120 having a data block in which the allocation state 303 is "unallocated" with reference to the data information management table 300 and transmits the prepared virtual server name list to the processing allocation control unit 1331 (S604).

The processing allocation control unit 1331 that receives the virtual server name list of the parallel distributed processing execution server 120 having the unallocated data block determines whether the parallel distributed processing execution server 120 transmitting the processing completion notification is included in the virtual server name list (S605).

As a result of the determination of step S6205, when the parallel distributed processing execution server 120 transmitting the processing completion notification exists in the list (S605→Yes), the processing allocation control unit 1331 selects one predetermined data block from the unallocated data blocks stored in the parallel distributed processing execution server 120 transmitting the processing completion notification with reference to the data information management table 300 (S606).

As a result of the determination of step S605, when the parallel distributed processing execution server 120 transmitting the processing completion notification does not exist in the list (S605→No), the processing of FIG. 16B is performed. In FIG. 16B, the processing allocation control unit 1331 requests for the virtual server name list of the parallel distributed processing execution server 120 which is operated on the same physical server as the parallel distributed processing execution server 120 transmitting the processing completion notification to the processing execution server managing unit 1333 (S607). Further, the request for the virtual server name list includes the virtual server name of the parallel distributed processing execution server 120 transmitting the processing completion notification.

Subsequently, the processing execution server managing unit 1333 transmits a virtual server name list of other parallel distributed processing execution servers 120 on the same physical server as the parallel distributed processing execution server 120 corresponding to the received virtual server name, to the processing allocation control unit 1331 (S608).

Further, the processing allocation control unit 1331 determines whether other parallel distributed processing execution server 120 on the physical server 210, where the parallel distributed processing execution server 120 transmitting the processing completion notification is operated, exist in the received virtual server name list (S609).

As a result of the determination of step S609, when other parallel distributed processing execution servers 120 exist (S609→Yes), the processing allocation control unit 1331 transmits the virtual server name of the parallel distributed processing execution server 120 transmitting the processing completion notification and the virtual server name list of the parallel distributed processing execution servers 120 which are operated on the same physical server and have unallocated data blocks, to the data transfer control server 140. The processing allocation control unit 1331 requests for a parallel distributed processing execution server 120 that holds a subsequently processed data block (S611).

As the result of step S609, when other parallel distributed processing execution servers 120 do not exist (S609→No), the processing allocation control unit 1331 requests for a virtual server name of a parallel distributed processing execution server 120 having a data block in which the task of the parallel distributed processing execution server 120 transmitting the processing completion notification subsequently processes (S610). Further, the request of the virtual server name includes the virtual server name of the parallel distributed processing execution server 120 transmitting the processing completion notification and the virtual server name list of the parallel distributed processing execution server 120 having the unallocated data block.

The data transfer control server 140 extracts the parallel distributed processing execution server 120 storing the data block which the parallel distributed processing execution server 120 transmitting the processing completion notification subsequently processes and transmits the extracted server to the parallel distributed processing control server 130 (S612). Further, the processing of step S612 corresponds to the processing of FIGS. 7A and 7B of the first embodiment.

Subsequently, the processing allocation control unit 1331 selects one predetermined data block from the unallocated data blocks stored in the parallel distributed processing execution server 120 corresponding to the received virtual server name (S613).

Further, the processing allocation control unit 1331 requests for transferring the data block selected in step S613 to the parallel distributed processing execution server 120 transmitting the processing completion notification, to the parallel distributed processing execution server 120 corresponding to the virtual server name received from the data transfer control server 140 (S614). In addition, the transmission request of the data block includes the data block ID of the selected data block and the virtual server name of the parallel distributed processing execution server 120 transmitting the processing completion notification.

Further, referring back to the processing of FIG. 16A, the processing allocation control unit 1331 requests for updating the data information management table 300 to the data information managing unit 1332 and requests for updating the task management table 600 to the task managing unit 1334 (S615). In addition, the updating request of the data information management table 300 includes the data block ID 301 of the selected data block, and the updating request of the task management table 600 includes a task ID received from the parallel distributed processing execution server 120 as the processing completion notification and the processing data block ID 604 of the selected data block.

The data information managing unit 1332 updates the allocation state 303 of the data information management table 300 corresponding to the data block of the data block ID included in the received updating request to "allocation completion". The task managing unit 1334 updates the execution state 603 of the task of the task management table 600 corresponding to the received task ID to "under execution" and updates the processing data block ID 604 to the received data block ID (S616).

Further, the processing allocation control unit 1331 transmits the processing execution request of the selected data block to the parallel distributed processing execution server 120 transmitting the processing completion notification (S617). In addition, the processing execution request includes the data block ID of the selected data block and the task ID to which the processing is allocated.

<Processing Execution Server Management Table>

FIG. 17 is a diagram illustrating one example of a processing execution server management table 1700 according to the second embodiment of the present invention. Further, the table of FIG. 17 corresponds to the processing execution server management table 500 illustrated in FIG. 5 of the first embodiment.

In the processing execution server management table 1700, as attribute information to manage the physical server 210 and the parallel distributed processing execution server 120, one entry is configured by a physical server name 1701 for identifying each physical server 210 and a virtual server name 1702 for identifying each parallel distributed processing execution server 120 constituted by the virtual servers.

<Processing Situation Management Table>

FIG. 18 is a diagram illustrating another example of a processing execution server management table 1800 according to the second embodiment of the present invention. Further, the table of FIG. 18 corresponds to the processing situation management table 800 illustrated in FIG. 8 of the first embodiment.

In the processing situation management table 1800, as attribute information to manage a processing progress situation of each parallel distributed processing execution server 120, one entry is configured by a physical server name 1801 for identifying each physical server 210, a virtual server name 1802 for identifying each parallel distributed processing execution server 120, a processing completion data rate 1803 indicating a rate of the processing completion data block to the data block stored in each parallel distributed processing execution server, and execution multiplicity 1804 indicating processing performance per unit time of each parallel distributed processing execution server.

Further, attribute information of a specification of hardware such as a CPU or a memory is not displayed in the processing situation management table 1800, but the processing situation management table 1800 may include the hardware spec.

<Summary>

As described above, according to the second embodiment, under the environment in which the multiple parallel distributed processing execution servers 120 are operated on the physical server 210 as the virtual server, even in a parallel distributed processing system in which a computer resource which is usable while executing the parallel distributed processing is changed and the execution multiplicity of the parallel distributed processing is changed, when processing of the data block 40 stored in another parallel distributed processing execution server 120 is allocated to a predetermined parallel disturbed processing execution server 120, the parallel distributed processing execution server 120 which is operated on the same physical server 210 is first selected as the transmission source server of the data block based on the processing progress situation of each parallel distributed processing execution server 120, the data processing performance per unit time, and the empty I/O resource amount to efficiently perform the entire parallel distributed processing.

The present invention can be applied to a parallel distributed processing system and in particular, is suitable for a parallel distributed processing system including a parallel distributed processing execution server in which allocation of a physical resource is changed.

What is claimed is:

1. A data transmission control method of a parallel distributed processing system in which a management computer selects a second parallel distributed processing execution server from a plurality of parallel distributed processing execution servers which is a transmission source of a data block from a plurality of data blocks allocated to a task of a first parallel distributed processing execution server from a plurality of tasks of a plurality of parallel distributed processing execution servers, in the parallel distributed processing system including a plurality of parallel distributed processing execution servers including a processor and a storage device, in which the storage device stores the plurality of data blocks divided in advance as processing target data and the processor executes tasks and processes the data blocks in parallel, and the management computer controlling the plurality of parallel distributed processing execution servers, the method comprising:

a first step of receiving, by the management computer, a completion notification indicating completion of the task from the first parallel distributed processing execution server;

a second step of respectively collecting, by the management computer, resource use amounts of the plurality of parallel distributed processing execution servers;

a third step of acquiring, by the management computer, states of the plurality of data blocks and the plurality of tasks held by the plurality of parallel distributed processing execution servers;

a fourth step of selecting, by the management computer, the second parallel distributed processing execution server transferring the data block to the first parallel distributed processing execution server, based on processing progress situations of the data blocks held by the plurality of parallel distributed processing execution servers and the resource use amounts of the plurality of parallel distributed processing execution servers;

a fifth step of calculating a rate of a processing completed data blocks, wherein the rate is calculated as dividing the number of processing completed data blocks by the total number of data blocks in each of the plurality of parallel distributed processing execution servers;

a sixth step of extracting a parallel distributed processing execution server in which the processing completed data rate is less than a predetermined threshold as a processing delay server;

a seventh step of selecting the second parallel distributed processing execution server from the extracted processing delay server;

an eighth step of transmitting, by the management computer, a command to transfer the data block to the first parallel distributed processing execution server, to the selected second parallel distributed processing execution server; and a ninth step of transmitting, by the management computer, a different command to execute a task processing the transferred data block, to the first parallel distributed processing execution server.

2. The data transmission control method of a parallel distributed processing system according to claim 1, wherein:

in the seventh step, processing performance per unit time of the parallel distributed processing execution server is determined through analyzing the execution multiplicity of the tasks and the processing delay server having lowest execution multiplicity is selected as the second parallel distributed processing execution server from the plurality of parallel distributed processing execution servers.

3. The data transmission control method of the parallel distributed processing system according to claim 1, wherein:

in the seventh step, a value indicating a hardware specification of the parallel distributed processing execution server is acquired as processing performance per unit time of the parallel distributed processing execution server and the processing delay server having a smallest value indicating the hardware specification is selected as the second parallel distributed processing execution server.

4. The data transmission control method of the parallel distributed processing system according to claim 1, wherein:

the seventh step includes:

a tenth step of acquiring a first empty I/O resource amount of the first parallel distributed processing execution server;

an eleventh step of acquiring a second empty I/O resource amount of the processing delay server; and a twelfth step of selecting the processing delay server in which a difference in empty I/O resource amount between the first parallel distributed processing execution server and the processing delay server is the smallest as the second parallel distributed processing execution server.

5. The data transmission control method of the parallel distributed processing system according to claim 4, wherein:

in the tenth step, a third empty I/O resource amount of a network and a fourth empty I/O resource amount of a disk I/O of the first parallel distributed processing execution server are acquired, in the eleventh step, the third empty I/O resource amount of a network and the fourth empty I/O resource amount of a disk I/O of the processing delay server are acquired, in the twelfth step, an absolute value of a difference between the third empty I/O resource amount of the network I/O of the first parallel distributed processing execution server and the third empty I/O resource amount of the network I/O of the processing delay server is acquired as a first absolute value, an absolute value of a difference between the fourth empty resource amount of the disk I/O of the first parallel distributed processing execution server and the fourth empty resource amount of the disk I/O of the processing delay server is acquired as a second absolute value, and a larger value of the first absolute value and the second absolute value is selected as an absolute value of the processing delay server, and a processing delay server having a smallest value of the absolute values of the processing delay server is selected as the second parallel distributed processing execution server.

6. The data transmission control method of the parallel distributed processing system according to claim 1, wherein:

the ninth step includes:

a tenth step of acquiring a first empty I/O resource amount of the first parallel distributed processing execution server;

an eleventh step of acquiring a second empty I/O resource amount of the processing delay server; and a twelfth step of selecting the processing delay server in which the difference in empty I/O resource amount is the smallest among processing delay servers having the larger I/O resource amount than the first parallel distributed processing execution server as the second parallel distributed processing execution server.

7. The data transmission control method of a parallel distributed processing system according to claim 1, wherein:

the parallel distributed processing execution server is executed as a virtual server provided by a virtualization unit executed on a physical server, and in the fourth step, a virtual server executed on the same physical server as the physical server executing the first parallel distributed processing execution server is first selected as the second parallel distributed processing execution server.

8. A parallel distributed processing system, comprising:

a plurality of parallel distributed processing execution servers including a processor and a storage device, in which the storage device stores a plurality of data blocks divided in advance as processing target data and the processor executes tasks and processing the plurality of data blocks in parallel;

a management computer controlling the plurality of parallel distributed processing execution servers, wherein the management computer includes:

a parallel distributed processing control unit controlling tasks for the plurality data blocks of the plurality of parallel distributed processing execution servers;

a data transfer control unit selecting a second parallel distributed processing execution server from a plurality of parallel distributed processing execution servers which is a transmission source of the data block from the plurality of data blocks with respect to a first parallel distributed processing execution server from the plurality of parallel distributed processing execution servers allocating the plurality of data blocks to a plurality of tasks among the plurality of parallel distributed processing execution servers;

a resource use amount managing unit respectively managing resource use amounts of the plurality of parallel distributed processing execution servers, wherein the parallel distributed processing control unit, receives a completion notification indicating completion of the task from the first parallel distributed processing execution server and acquires states of the plurality of data blocks and the plurality of tasks held by the plurality of parallel distributed processing execution servers, the data transfer control unit calculates a rate of a processing completed data blocks, wherein the rate is calculated as dividing the number of processing completed data blocks by the total number of data blocks in each of the plurality of parallel distributed processing execution servers, extracts a parallel distributed processing execution server in which the processing completed data rate is less than a predetermined threshold as a processing delay server, and selects the second parallel distributed processing execution server from the extracted processing delay server, wherein the data transfer control unit, selects a second parallel distributed processing execution server from the plurality of parallel distributed processing execution servers transfers the data block to the first parallel distributed processing execution server from the plurality of parallel distributed processing execution servers, based on processing progress situations of the plurality of data blocks held by the plurality of parallel distributed processing execution servers and the resource use amounts of the plurality of parallel distributed processing execution servers, and transmits a command to transfer the data block to the first parallel distributed processing execution server, to the selected second parallel distributed processing execution server from the plurality of parallel distributed processing execution servers, and wherein the parallel distributed processing control unit transmits a different command to execute a task processing the transferred data block, to the first parallel distributed processing execution server.

9. The parallel distributed processing system according to claim 8, wherein:

the data transfer control unit acquires a first empty I/O resource amount of the first parallel distributed processing execution server, acquires a second empty I/O resource amount of the processing delay server, and selects the processing delay server in which a difference in empty I/O resource amount between the first parallel distributed processing execution server and the processing delay server is the smallest as the second parallel distributed processing execution server.

10. The parallel distributed processing system according to claim 8, wherein:

the parallel distributed processing execution server is executed as a virtual server provided by a virtualization unit executed on a physical server, and the data transfer control unit first selects a virtual server executed on the same physical server as the physical server executing the first parallel distributed processing execution server as the second parallel distributed processing execution server.

11. A non-transitory computer-readable storage medium storing a program to select a second parallel distributed processing execution server from a plurality of parallel distributed processing execution servers which is a transmission source of a data block from a plurality of data blocks allocated to a task of a first parallel distributed processing execution server among the plurality of parallel distributed processing execution servers, which executes in the computer:

a first procedure of receiving a completion notification indicating completion of the task from the first parallel distributed processing execution server;

a second procedure of respectively collecting resource use amounts of the plurality of parallel distributed processing execution servers;

a third procedure of acquiring states of the plurality of data blocks and the plurality of tasks held by the plurality of parallel distributed processing execution servers;

a fourth procedure of selecting the second parallel distributed processing execution server transferring the data block to the first parallel distributed processing execution server, based on processing progress situations of the data blocks held by the plurality of parallel distributed processing execution servers and the resource use amounts of the plurality of parallel distributed processing execution servers;

a fifth procedure of calculating a rate of a processing completed data blocks, wherein the rate is calculated as dividing the number of processing completed data blocks by the total number of data blocks in each of the plurality of parallel distributed processing execution servers;

a sixth procedure of extracting a parallel distributed processing execution server in which the processing completed data rate is less than a predetermined threshold as a processing delay server;

a seventh procedure of selecting the second parallel distributed processing execution server from the extracted processing delay server;

an eighth procedure of transmitting a command to transfer the data block to the first parallel distributed processing execution server, to the selected second parallel distributed processing execution server; and a ninth procedure of transmitting a different command to execute a task processing the transferred data block, to the first parallel distributed processing execution server.

* * * * *